(12) United States Patent
Kimata et al.

(10) Patent No.: US 6,621,868 B1
(45) Date of Patent: *Sep. 16, 2003

(54) VIDEO COMMUNICATION SYSTEM AND VIDEO COMMUNICATION METHOD

(75) Inventors: Hideaki Kimata, Tokyo (JP); Yasuhiro Tomita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/260,555

(22) Filed: Mar. 2, 1999

(30) Foreign Application Priority Data

Mar. 2, 1998 (JP) .......................................... 10-049094
Mar. 2, 1998 (JP) .......................................... 10-049095

(51) Int. Cl.[7] ............................................... H04B 1/66
(52) U.S. Cl. ................................................. 375/240.27
(58) Field of Search .......................... 375/240.27, 240, 375/240.12

(56) References Cited

U.S. PATENT DOCUMENTS

| 5,719,646 | A | * | 2/1998 | Kikuchi et al. | ........ | 375/240.27 |
| 6,040,879 | A | * | 3/2000 | Park | ...................... | 375/240.27 |
| 6,049,570 | A | * | 4/2000 | Fukunaga et al. | ..... | 375/240.12 |
| 6,081,296 | A | * | 6/2000 | Fukunaga et al. | ..... | 375/240.12 |
| 6,111,915 | A | * | 8/2000 | Fukunaga et al. | ..... | 375/240.12 |
| 6,111,917 | A | * | 8/2000 | Tomita et al. | ......... | 375/240.27 |

FOREIGN PATENT DOCUMENTS

| JP | 62137983 | 6/1987 |
| JP | 01155790 | 6/1989 |
| JP | 03006187 | 1/1991 |
| JP | 09-149421 | 6/1997 |
| JP | 10079949 | 3/1998 |
| JP | 10-191356 | 7/1998 |
| JP | 10271507 | 10/1998 |

OTHER PUBLICATIONS

S. Fukunaga et al., "Adaptive Mode Switching for Error Resilient Video Coding Using Backward Channel Signaling," The Institute of Image Information and Television Engineers, vol. 51, No. 10, pp. 1715–1721 (1997).

First Office Action Issued on the corresponding application No. 11–054810 filed in the Japanese Patent Office, issued date: Aug. 22, 2000.

Kimata, H., et al., "Study on Method of Receiver–Oriented Picture Selection on the NEWPRED," *Information Processing Conference, Research Report 98–AVM–20*, Mar. 6, 1998.

Kimata, H., et al., "A Study on Reference Picture Buffer Management of Decoder for Error Resilient Visual Telecommunication Using Back Channel Signaling," *Electrical Information Communication Conference, 1998 Plenary Session, Reports*, Mar. 6, 1998.

(List continued on next page.)

*Primary Examiner*—Chris Kelley
*Assistant Examiner*—Allen Wong
(74) *Attorney, Agent, or Firm*—Burns, Doane, Swecker & Mathis L.L.P

(57) ABSTRACT

The present invention relates to a video communication system and a video communication method along with a computer readable recording medium which records the video communication program. When encoding the input picture, the encoded reference picture selecting unit 4 switches the reference picture to the latest previously encoded picture depending on the designation contents by the continuous reference designation data and the specified reference designation data sent from the continuous reference picture designation data sending unit 27 and the specified reference picture designation data sending unit 29 on the receiving side.

5 Claims, 13 Drawing Sheets

OTHER PUBLICATIONS

Kimata, H., et al., "Study on Adaptive Reference Picture Selection Coding Scheme for the NEWPRED Receiver–Oriented Mobile Visual Communication," *IEEE Global Telecommunications Conference*, Nov. 8–12, 1998.

Tominaga, S., et al., "Applied Mode Switching Format in an Error Resilient Picture Encoder Used for Reception Confirmation," *Visual Information Media Conference Proceedings*, vol. 51, No. 10, pp. 1715–1721, 1997.

* cited by examiner

FIG. 1
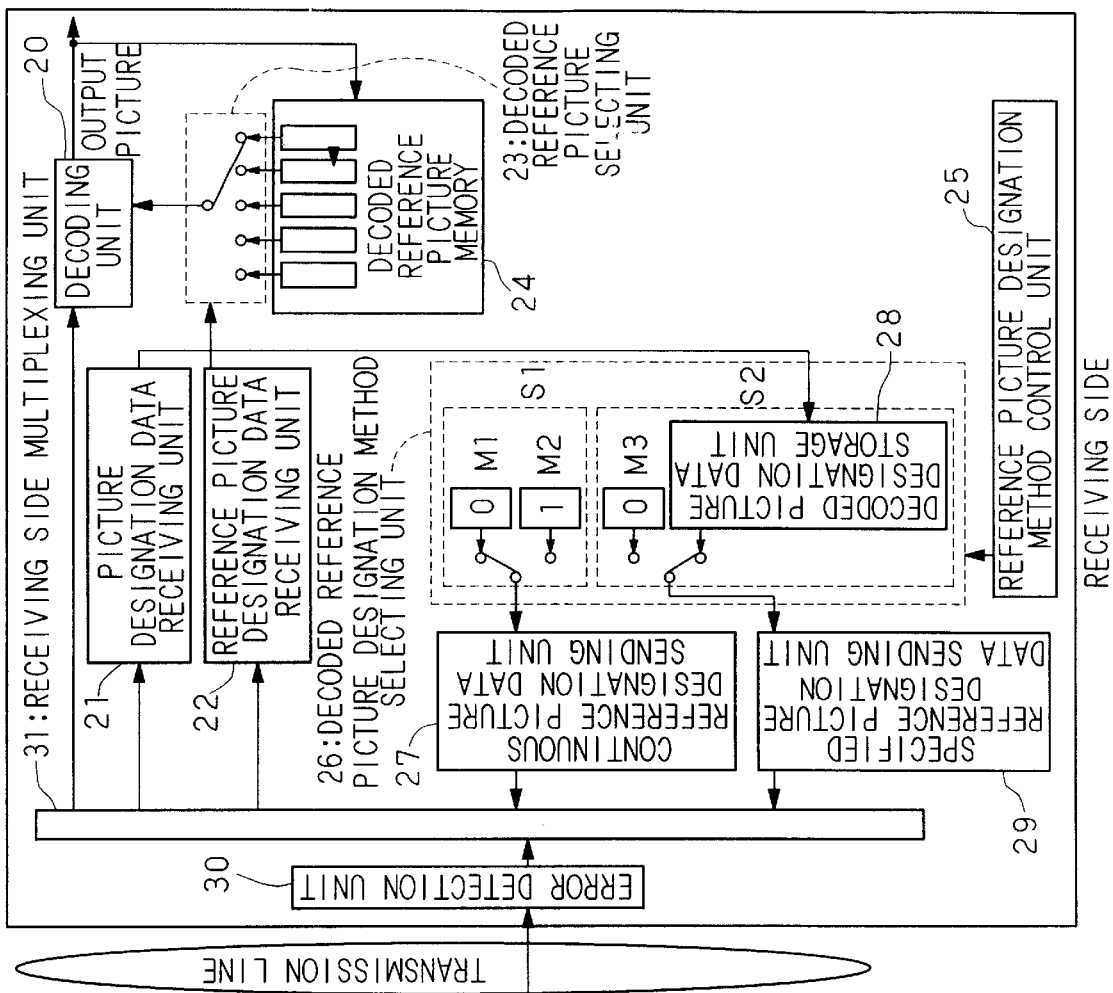
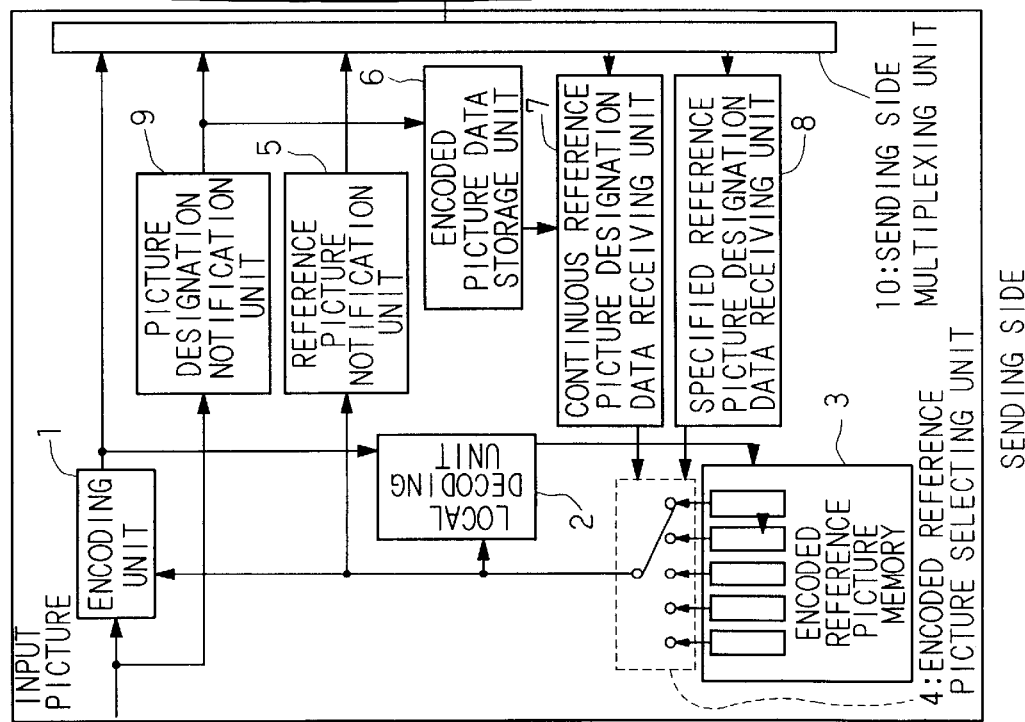

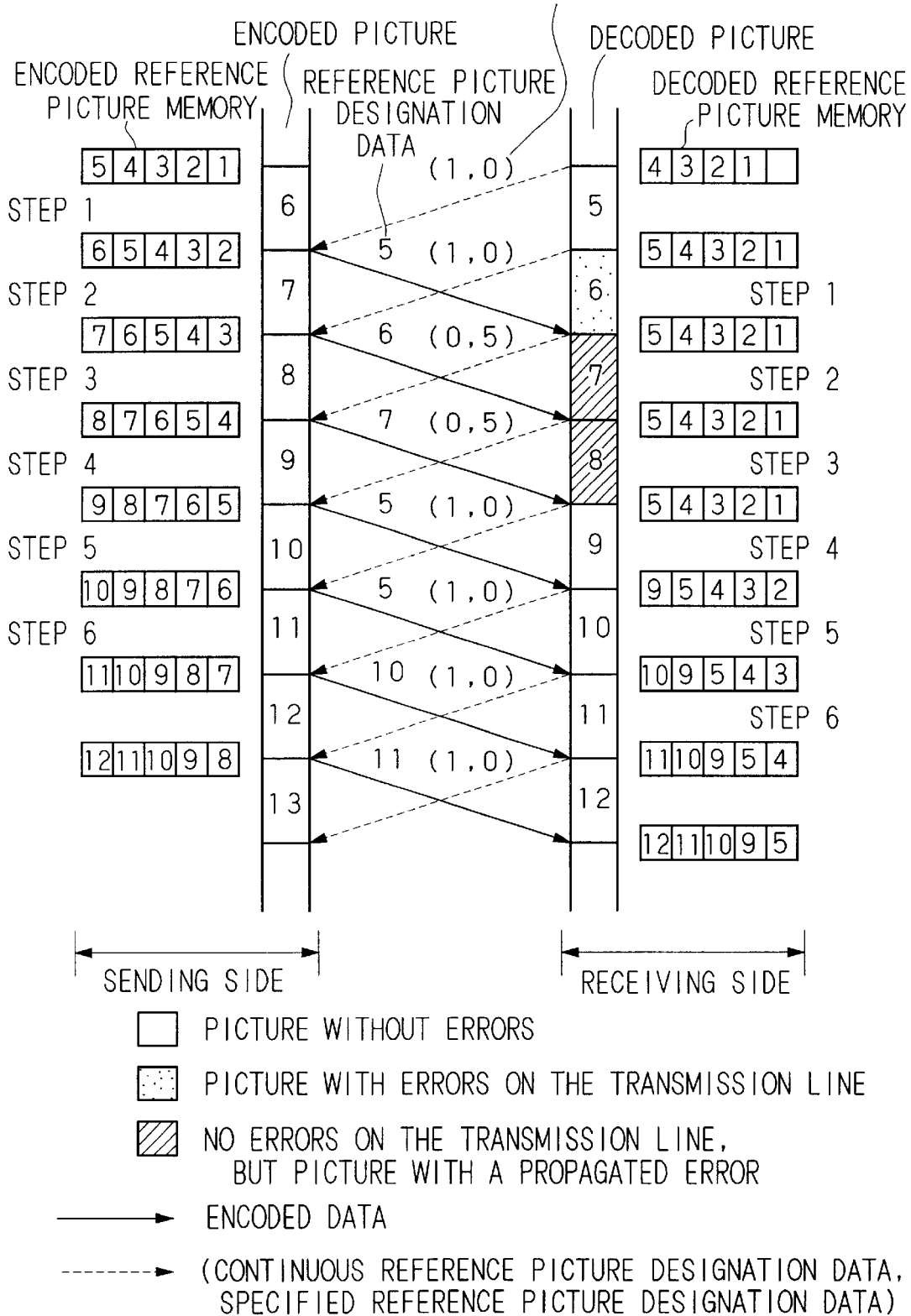

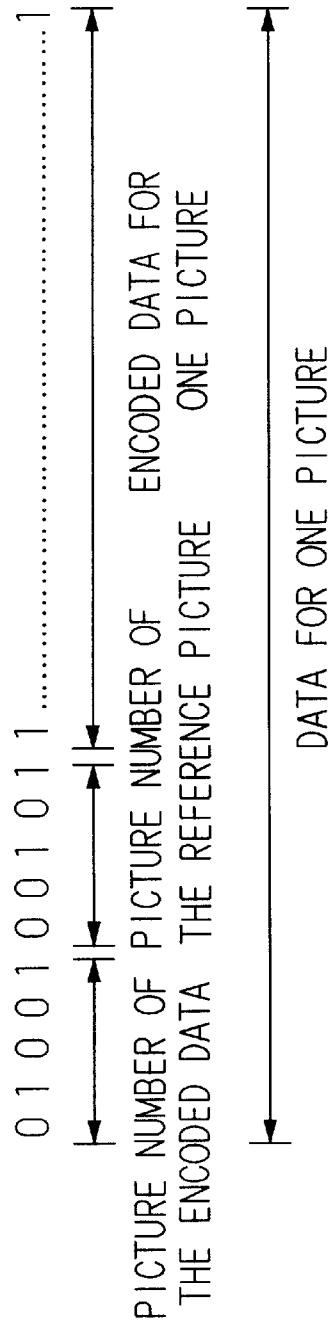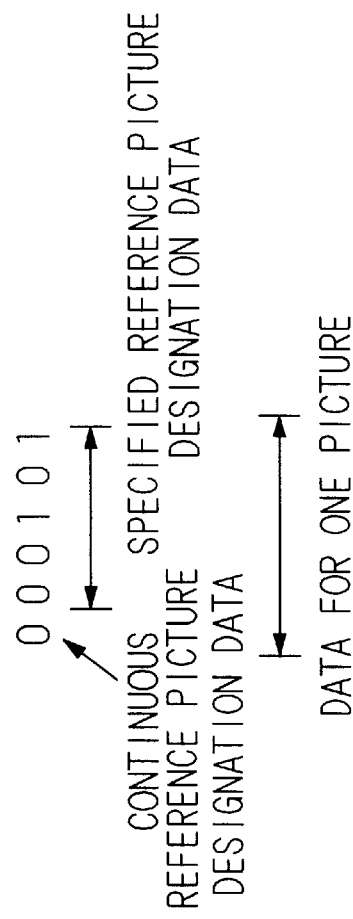

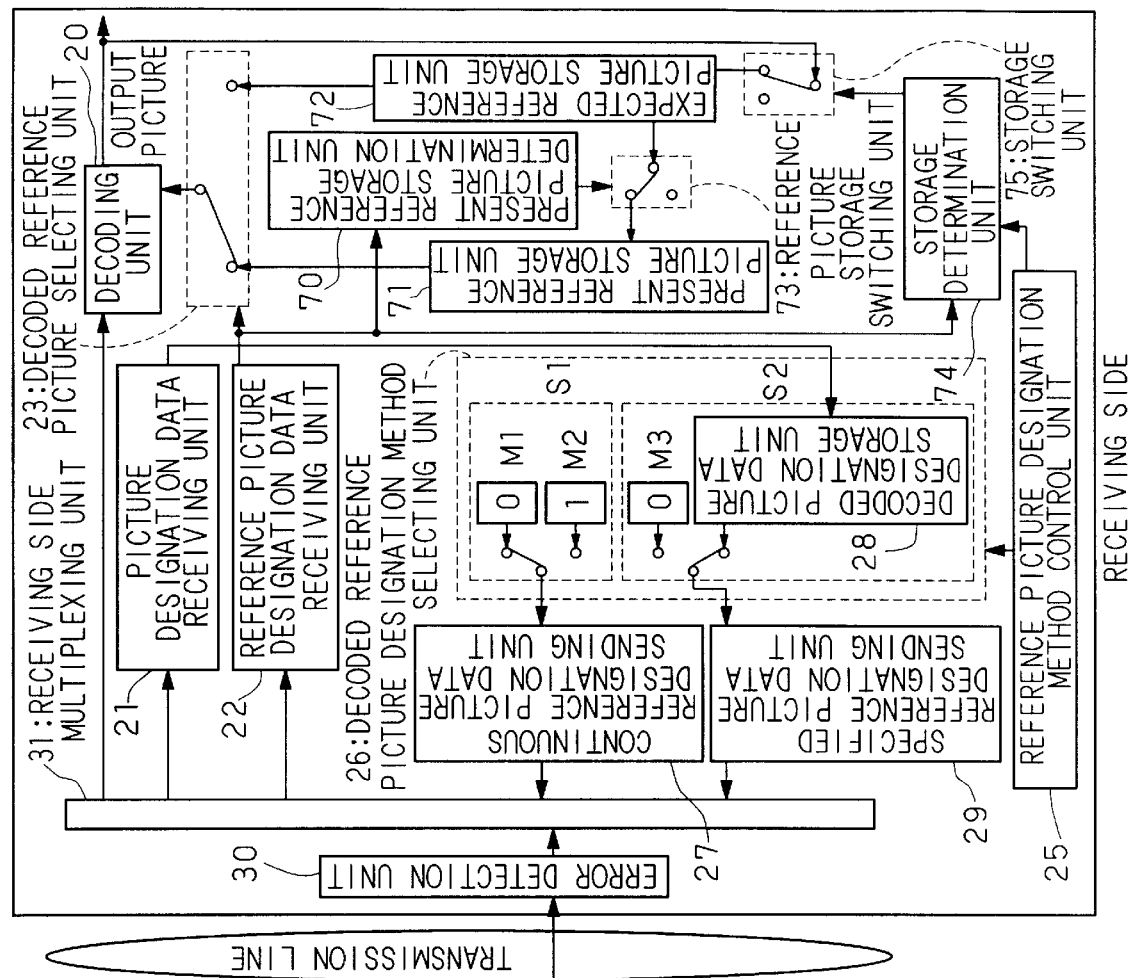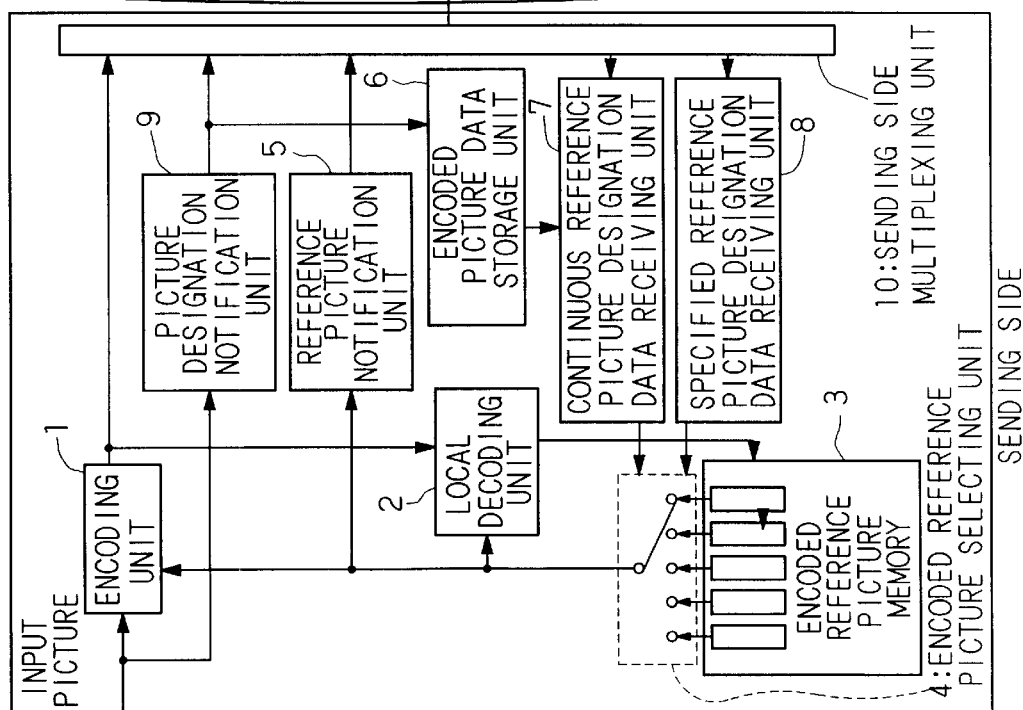
FIG. 14

FIG. 15

*(Figure content: diagram showing sending side and receiving side with encoded reference picture memory, reference picture designation data, continuous/specified reference picture designation data, decoded picture, expected reference picture storage unit, decoded picture designation data storage unit, present reference picture storage unit across Steps 1-11.)*

Legend:
- □ PICTURE WITHOUT ERRORS
- ▦ PICTURE WITH ERRORS ON THE TRANSMISSION LINE
- ▧ NO ERRORS ON THE TRANSMISSION LINE, BUT PICTURE WITH A PROPAGATED ERROR
- ⟶ ENCODED DATA
- ⤑ (CONTINUOUS REFERENCE PICTURE DESIGNATION DATA, SPECIFIED REFERENCE PICTURE DESIGNATION DATA)

VIDEO COMMUNICATION SYSTEM AND VIDEO COMMUNICATION METHOD

BACKGROUND OF THE INVENTION

1. Field of the Invention

The present invention relates to a video communication system wherein a picture is sent via a transmission line on which errors can be generated during sending through a wireless transmission line, a LAN, etc., a video communication method, and computer readable recording media on which a video communication program is recorded.

This application is based on Japanese Patent Application, No. Hei 10-49094 and Japanese Patent Application, No. Hei 10-49095, the contents of which are incorporated herein by reference.

2. Description of the related Art

In the communication of video data, the inter-frame prediction encoding method is a representative video encoding method for increasing compressibility. In this inter-frame prediction encoding method, at the sending side, the predictive error between the latest previously encoded picture and the present picture is encoded, and the only this part is sent as encoded data via the transmission line to the receiving side. Then, at the receiving side, using a picture previously received, decoded and then stored as a reference picture, the present picture is decoded from this reference picture and the received data.

When encoded data using this inter-frame prediction encoding is transmitted, if an error is carried into the encoded data over the transmission line, the picture will be damaged and moreover the error will propagate to the picture of the later encoded data. That is, when the receiving side uses erred picture as a reference picture, even if encoded data of a subsequent picture does not have an error, the error will propagate to the decoded picture because the area damaged by the error is referenced.

One technology for resolving this problem is a method wherein the sending side refers only to a picture which can be correctly decoded at the receiving side, as in the Annex N of the picture encoding method ITU—T H. 263. In this method, a reference picture memory for a plurality of pictures is provided at the sending side and receiving side, and furthermore, the sending side decodes the reference picture by using a picture designated at the receiving side. The encoding—decoding sequence according to the this method is as follows.

First, the sending side sends a signal designating a picture to be used as the reference picture at the same time as the encoded data, and the receiving side uses as the reference picture the picture designated by the signal designating the reference picture, and the received encoded data is decoded. In addition, the pictures which could be correctly decoded are sequentially stored in the reference picture memory at the receiving side. Next, the receiving side sends to the sending side the information concerning whether the encoded data could be decoded and information designating the newest picture in the reference picture memory. In addition, at the sending side, by encoding using a correctly decodable picture designated by the receiving side as the reference picture, the receiving side uses the picture stored in the reference picture memory as the reference picture, and it can be decoded without error.

Here, in the above-described "information concerning whether the encoded data can be decoded" sent to the sending side by the receiving side, there are two types of signal: the ACK signal and the NACK signal. First, the ACK signal is sent to the sending side by the receiving side when the picture is correctly decoded, and includes the picture designation data which designates a correctly decoded picture. In addition, the NACK signal is sent to the sending side by the receiving side when the picture cannot be correctly decoded, and includes picture designation data which designates the newest picture among pictures stored in the receiving side's reference picture memory.

In addition, at the sending side, when the above-described ACK signal or NACK signal is received, the methods of changing the reference picture used in the encoding can be roughly divided into two types.

The first method switches from the reference picture used in the previous encoding to the picture designated by the picture designation data of the correctly decoded picture on the receiver side included in the ACK signal, or by the picture designation data of the most recent picture among the pictures stored in the reference picture memory on the receiver's side included in the NACK signal. In this method, encoding is carried out by changing the reference picture so that the sending side refers to the picture which could be correctly decoded at the receiving side for every picture. This is called the ACK method.

In normal inter-frame prediction encoding, because the previous picture is always made the reference picture, when one picture has an error, the error will necessarily propagate to the next picture. However, in the ACK method, there is no propagation of subsequent pictures irrespective of whether or not the previous received picture is decoded without error because the reference picture is changed every picture. However, for each picture, the encoding efficiency is lower than normal inter-frame encoding.

The second method switches the reference picture used in the previous encoding to the designated picture by the picture designation data, included in the NACK signal, of the newest picture among the pictures stored in the reference picture receiving side memory. In addition, in this method, when a NACK signal is not received, encoding using the latest previous picture as the reference is carried out. This is called the NACK method.

In this NACK method, if there is an error in one picture, until the reference picture is switched at the sending side by sending the NACK signal, the error propagates like a normal inter-frame prediction encoding. When the picture with the error is not displayed, the propagation of this error will cause a lowering of the number of pictures that can be correctly decoded. However, the reference picture is changed only when a NACK signal is received, and thus the encoding efficiency is higher than the above-described ACK method.

The differences between the ways these two above-described methods switch the reference picture lies in the switching method of the reference picture at the sending side when receiving an ACK signal sent when the receiving side has correctly decoded the picture. Thus, there is a difference in whether to change the reference picture according to the picture designation data of the picture which has been correctly decoded at the receiving side included in the ACK signal, or to make the latest picture previously encoded at the sending side the reference picture.

In any case, depending on the aim of the communication, either the ACK method, which has the effect of decreasing the propagation of errors, or the NACK method, which has the effect of reducing the decrease in encoding efficiency, can be chosen, and this choice can be assumed before the commencement of communication and during communication.

Concerning the designating of the ACK method or the NACK method, when the designation is made at the beginning of the communication, it is possible for the receiving side to designate to the sending side in advance whether the ACK method or NACK method is being used. However, when the designation occurs during a communication, in the conventional methods, the sending side has been able to choose whether to use the ACK method or the NACK method, while the receiving side could not do so.

This is caused by the fact that what the receiving side designates to the sending side is only which specific picture is to be made the reference picture, and during communication, clearly, there was no method for the receiving side to designate to the sending side that the latest previously encoded picture is to be made the reference picture, and thus during communication the receiving side could not designate the NACK method, and there was no means to change from the ACK method to the NACK method.

Because of this, it was not possible to control the prioritizing of decreasing propagation of errors or reducing the decrease in encoding efficiency according to the requirements of the receiving side, by changing from the ACK method or to the NACK method during communication.

Furthermore, in the conventional ACK methods, when the memory capacity of the reference picture memory at the receiving side is small in comparison to the amount of the encoded and decoded picture data during the delay period, the oldest picture is deleted from the reference picture memory in order to store a newly decoded picture. Thus, there are cases in which the picture decoded within the delay time is deleted from the reference picture memory. When this happens, the reference picture is not stored in the reference picture receiving side memory, and it cannot decode the encoded data.

In this reference picture receiving side memory, the event which could not be decoded because there is no reference picture designated by the sending side, decreases the number of decodable pictures, and further decreases the efficiency of the inter-frame difference coding. Because of this, in the conventional methods, when the memory capacity of the reference picture memory is small in comparison to the encoded and decoded picture data during the delay period, changing from the NACK method to the ACK method was not possible.

Because the transfer of the encoded data and the picture designation data occurs via the transmission line, a delay occurs between the time the sending side encodes as the reference picture the picture indicated by the information for designating the newest picture in the reference picture receiving side memory sent from the receiving side and the time this encoded data arrives at the receiving side. Thus, at the receiving side, it is necessary to prepare for the case wherein after decoding the encoded data changed by the reference picture, this decoded picture is stored, and subsequently the sending side designates this picture as the reference picture.

SUMMARY OF THE INVENTION

In consideration of the above, one object of the present invention is to provide a method for instructing the sending side to encode using the latest previously encoded picture as a reference picture, as in inter-frame prediction encoding, and in this manner, provide an video communication method and a picture communication system along with a computer readable recording medium which records the picture communication program which makes possible the receiving side instructing the sending side to encode using either a specified picture as the reference picture or encoding using the latest previously encoded picture as the reference picture, and in this manner enabling principally the receiving side to carry out adjustment of the reducing of the propagation of errors or the reducing of the lowering of the encoding efficiency.

In addition, a further object of the present invention is to provide an video communication method and a picture communication system along with a computer readable recording medium which records the picture communication program which makes possible reducing the propagation of an error similarly to the ACK method, even in the case that the memory capacity of the reference picture memory at the receiving side is small compared to the amount of encoded and decoded picture data during the delay period of the picture data between transmission and reception.

According to the present invention, the above-described objects can be achieved by the sending side encoding an input picture by the inter-frame prediction encoding method, and sending this encoded data and the picture designation data designating the reference picture that was used during this encoding to the decoding side, and at the same time this encoded data is decoded, and this decoded picture is stored in the memory of the sending side as the reference picture. When a specified reference picture among the reference pictures stored in the memory of the sending side is designated by the receiving side, encoding of the input picture using this specified reference picture is carried out, and when the latest previously encoded picture is designated by the receiving side, encoding of the input picture is carried out using the latest previously encoded picture as the reference picture.

In addition, according to the present invention, when the decoded picture is stored in the receiving side memory as the reference picture and decoding of the received encoded data is carried out, a reference picture, which was designated by the picture designation data sent from the sending side and used for encoding the encoded data, is selected from among the reference pictures stored in the receiving side memory, and used as the reference picture to be used when encoding, the receiving side instructs the sending side, based on the specific condition as to whether to use a specified picture among the plurality of pictures decoded in the past at the receiving side as the reference picture or whether to use the latest previously encoded picture as the reference picture. At this time, when the sending side is instructed to use a specified picture among the plurality of pictures encoded in the past, the reference picture designation data specifying the specified picture is sent.

Here, instructions by the user of the receiving side, whether or not there is an error in the encoded data the receiving side received, or the degree of the data delay time between sending and receiving, etc., might be considered examples of the above-mentioned given conditions.

Whereas conventionally there has clearly been no means for the receiving side to designate a picture previously encoded as the reference picture and the sending side to use as a reference picture the latest previously encoded picture during communication, in the present invention it is possible for the receiving side to instruct the sending side to select as the reference picture to be used to encode the input picture the picture the sending side previously encoded by sending continuous reference picture designation data.

In addition, the above receiving side can also instruct the sending side to select the picture which could be correctly decoded by the receiving side as the reference picture used to encode the input picture by sending specific reference picture designation data to the sending side. That is, the receiving side can instruct the sending side to use the reference picture change method of the ACK method or the reference picture change method of the NACK method, and for example, depending on the communication conditions during transmission and reception, the receiving side can principally carry out the adjustment of reducing the propagation of errors or reducing the lowering of the encoding efficiency.

In addition, a further object of the present invention is achieved by the sending side having a sending side memory which stores a plurality of pictures encoded in the past as reference pictures, selects from this sending side memory a reference picture specified by encoded reference picture designation data sent from the receiving side, and using this selected reference picture, the input picture is inter-frame difference encoded, and along with this encoded data, the reference picture designation data specifying the reference picture used in this encoding is sent to the receiving side. Furthermore, the receiving side decodes the encoded data sent from the sending side using as a reference picture a picture, specified by the above reference picture designation data, selected from among a plurality of pictures decoded in the past and stored in the receiving side memory, determines whether or not this decoded picture is stored in the receiving side memory as a reference picture, stores in the receiving side memory only decoded pictures determined to be stored as reference pictures, and at the same time, makes the reference picture one picture from among the pictures stored in the receiving side memory used when encoding, and sends the data specifying the picture made this reference picture to the sending side as encoded reference picture designation data.

According to the structure of the above-described invention, because the reference picture designated from the sending side in the receiving side memory is always stored and can be referenced when decoding, even when the memory capacity of the receiving side memory is smaller than the amount of the encoded and decoded picture data during the delay period, until receiving the encoded data using as a reference picture the picture specified by the encoded reference picture designation data that the receiving side sends to the sending side, it is possible to continue storing in the receiving side memory, and because the reference picture used in encoding is always present in the receiving side memory, reliable decoding is possible.

Furthermore, in the present invention, the two above-described structures can be appropriately combined, and the effects obtained by each structure can be obtained simultaneously.

In addition, in the present invention, as a method for designating the latest previously encoded picture as the reference picture, the receiving side can send to the sending side a signal having a specific code. In addition, each time the receiving side receives encoded data, the receiving side can instruct the sending side which reference picture is to be used for encoding.

Here, the above-mentioned instructions for the sending side about the reference picture can be implemented by sending to the sending side either a continuous reference picture designation signal which instructs the sending side to use as the reference picture the latest previously encoded picture or the specific designated reference picture signal which instructs the sending dise to use as the reference picture a particular picture from among the plurality of past decoded pictures at the receiving side.

BRIEF DESCRIPTION OF THE DRAWINGS

FIG. 1 is a block diagram showing the structure of the video communication system according to the first embodiment of the present invention.

FIG. 3 shows an example of the operation when there is an error in the encoded data in the above video communication system.

FIG. 4 shows an example of the format of the data sent from the sending side to the receiving side in the above video communication system.

FIG. 5 shows an example of the format of the data sent from the receiving side to the sending side in the above video communication system.

FIG. 14 is a block diagram showing the structure of the video communication system according to the forth embodiment of the present invention.

FIG. 15 is an example of the operation in the above video communication system.

DESCRIPTION OF THE PREFERRED EMBODIMENTS

Figure 2:
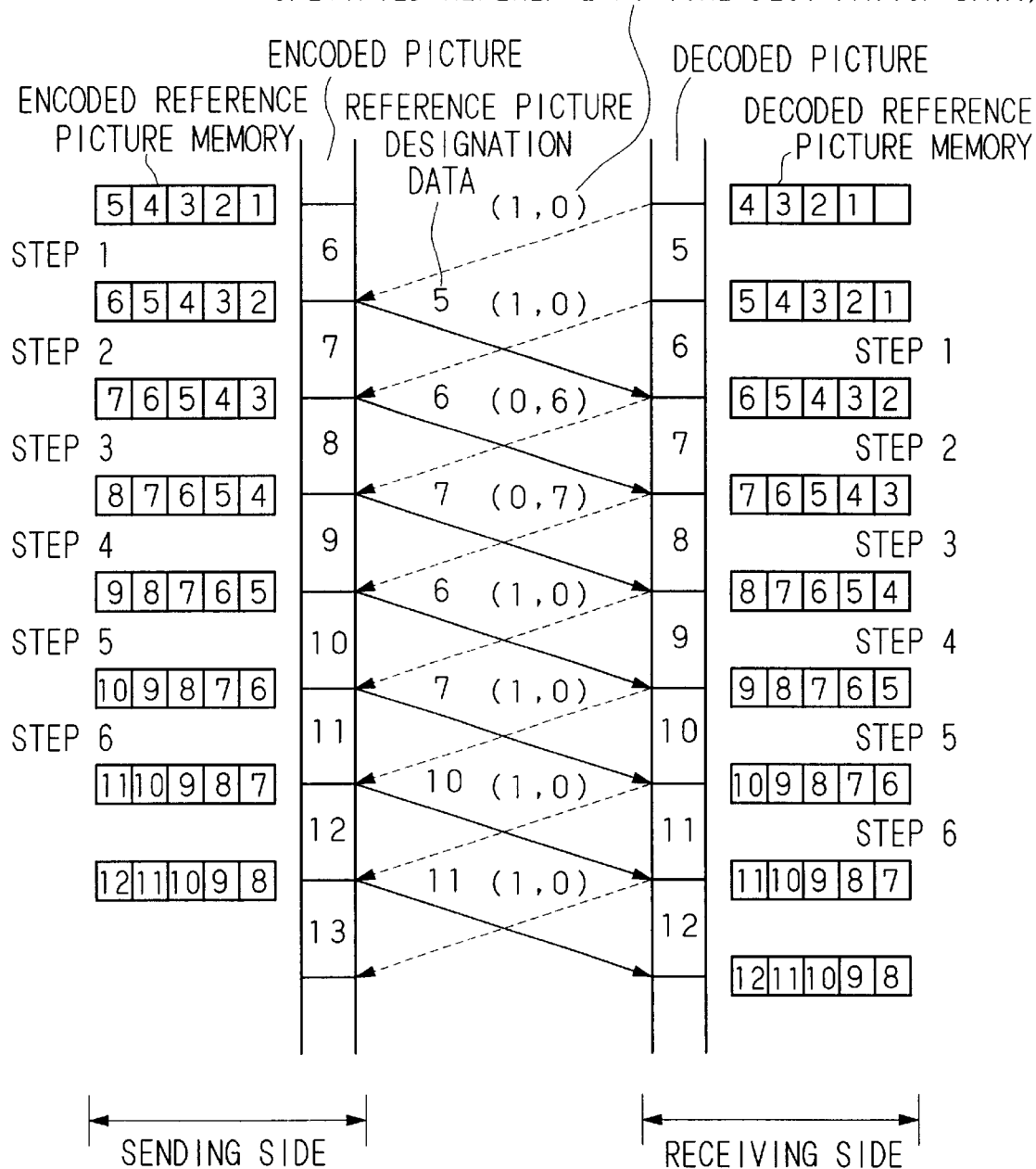
FIG. 2 shows an example of the operation when there is no error in the encoded data in the above video communication system.

The following embodiments do not limit the invention according to the claims, and in addition combinations of all the characteristics explained in the embodiments do not exhaust what is necessary as the resolving means of the invention.

Below, each of the embodiments of the present invention will be explained with reference to the figures. Moreover, in each of the embodiments explained below, the picture designation data for designating each picture is a serial number, that is, given to the number of the encoded picture, and this number is called the picture number. In addition, '0' is not used as a picture number, and the picture number of the first encoded picture is '1', and thereafter this is increased by 1 according to the number of the encoded picture.

First Embodiment

FIG. 1 is a block diagram showing the structure of the video communication system in the first embodiment of the present invention. At the sending side shown in this figure, the encoding unit 1 uses as the reference picture the picture selected by the encoded reference picture selecting unit 4, encodes the input picture, and sends this encoded data to the receiving side. The local decoding unit 2 decodes the encoded data sent from the encoding unit 1 using the same reference picture used for encoding as the reference picture.

Encoded reference picture memory 3 stores the decoded pictures decoded by the local decoding unit 2. Here, the encoded reference memory 3 has a memory capacity of five pictures, and sequentially stores each decoded picture decoded by the local decoding unit 2. When more than five pictures are stored, the oldest stored picture is deleted. The reference picture notification unit 5 sends the reference picture designation data which shows the picture number of the picture used as the reference picture when the encoding data that is sent from the encoding unit 1 is encoded.

The encoded picture designation data storage unit 6 stores picture designation data of one encoded picture until the next picture is encoded. The continuous reference picture designation data receiving unit 7 receives continuous reference picture designation data (described hereinbelow) which designates making the previous encoded picture sent from the receiving side the reference picture. The specified reference picture designation data receiving unit 8 receives specified reference picture designation data (described hereinbelow) which designates a specified picture sent from the receiving side as the reference picture.

The encoded reference picture selecting unit 4 selects the picture designated by the picture designation data stored in the encoded picture designation data storage unit 6 from the pictures stored in the encoded reference picture memory 3, and sends this to the encoding unit 1, the local decoding unit 2, and the reference picture notification unit 5 when the continuous reference picture designation data received from the above continuous reference picture designation data receiving unit 7 is a picture number other then '0'. In addition, when the specified reference picture designation data received from the above specified reference picture designation data receiving unit 8 is a picture number other than '0', the picture designated by this specified reference picture designation data is selected from among the pictures stored in the encoded reference picture memory 3, and sent to the encoding unit 1, the local decoding unit 2, and the reference picture notification unit 5.

The picture designation data notification unit 9 sends picture designation data showing the picture number of the encoded picture by the encoding unit 1. The sending side multiplexing unit 10 multiplexes and sends to the receiving side the encoded data sent from the encoding unit 1, the reference picture designation data sent from the reference picture notification unit 5, and the picture designation data sent from the picture designation data notification unit 9.

Here, FIG. 4 shows the format of the data sent to the receiving side from the sending side multiplexing unit 10. As shown in this figure, the format of the data sent to the receiving side is arranged in the sequence of picture designation data, reference picture designation data, and encoded data sent from the encoding unit 1. Moreover, FIG. 4 illustrates the case wherein the picture designation data shows the number '9' the reference picture designation data shows the picture number '5', and each picture number is represented with 5 bits.

In addition, the sending side multiplexing unit 10 receives multiplexed data comprising the continuous reference picture designation data and the specified reference picture designation data sent from the receiving side via the transmission line, and after demultiplexing each of the reference picture designation data, sends them to the continuous reference picture designation data receiving unit 7 and the specified reference picture designation data receiving unit 8.

Next, at the receiving side, the decoding unit 20 uses the reference picture selected by the decoded reference picture selecting unit 23 described below, and decodes the encoded data sent from the sending side. The picture designation data receiving unit 21 receives the picture designation data sent from the picture designation data notification unit 9. The reference picture designation data receiving unit 22 receives the reference picture designation data sent from the reference picture notification unit 5 at the sending side. The decoded reference picture selecting unit 23 selects the picture with the picture number indicated by the reference picture designation data received from the reference picture designation data receiving unit 22 from among the pictures stored in the decoded reference picture memory 24, described next, and sends this to the decoding unit 20.

The decoded reference picture memory 24 stores in sequence the pictures which could be correctly decoded in the decoding unit 20. In addition, the decoded reference picture memory 24 can store the decoded picture data for five pictures. When there are more than five stored pictures, the oldest stored picture is deleted. At the sending side, the reference picture designation method control unit 25 controls whether the latest previously encoded picture is designated as the reference picture to be used when encoding or whether the picture designated by the picture designation data stored in the decoded picture designation data storage unit 28 is designated as the reference picture to be used when encoding.

Here, the following example will be given as control conditions of the designation method in the above-mentioned reference picture designation method control unit 25.

1. According to the Point of View of the Receiving Side User

When the receiving side user is not concerned with errors sent between many frames and wants to increase the encoding efficiency, according to the instructions of the receiving side user, the method of sending a signal from the continuous reference picture designation data sending part (NACK method) is switched to the method of sending a signal from the specified reference picture designation data sending part (ACK method).

Contrariwise, when the receiving side user wants to avoid errors even in one frame, according to the instructions of the receiving side user, the method of sending a signal from the specified reference picture designation data sending part (ACK method) is switched to the continuous reference picture designation data sending part (NACK method).

2. Presence of an Error Detected in the Received Encoded Data

When a transmission error has been detected in the error detection part, the method of sending a signal from the continuous reference picture designation data sending part (NACK method) is switched to the method of sending a signal from the specified reference picture designation data sending part (ACK method), and when no transmission error has been detected, the specified reference picture designation data sending part (ACK method) is switched to the continuous reference picture designation data sending part (NACK method).

3. Dependence on the Sending Delay Period

When switching to the reference picture corresponding to the specified reference picture designation data, the reference picture becomes temporally distant, and the encoding efficiency becomes greatly lowered. In order to avoid this, when the delay period is small, the continuous reference picture designation data sending part (NACK method) is switched to the method of sending a signal from the specified reference picture designation data sending part (ACK method), and when the delay period becomes large, the specified reference picture designation data sending part (ACK method) is switched to the continuous reference picture designation data sending part (NACK method).

The decoded reference picture designation method selecting unit 26 comprises a switch S1 for selecting the contents of the continuous reference picture designation data sent to the sending side, and a switch S2 for selecting the content of the specific reference picture designation data. Here, switch S1 is structured so as to select the sent from either memory M1 in which the data '0' is stored, or the memory M2 in which the data '1' is stored. In addition, switch S2 is structured so as to select the sent either from memory M3 in which data '0' is stored or the decoded picture designation data storing unit 28.

In addition, depending on the designation method, controlled by the reference picture designation method control unit 25, the content of the continuous reference picture designation data and the specified reference picture designation data sent to the sending side is selected. That is, when instructed by the reference picture designation method control unit 25 to make the latest previously decoded picture the reference picture, the decoded reference picture designation method selecting unit 26 switches switch S1 to memory M2 side, and switches S2 to memory M3. In this manner, in the above case, '1' is sent as the continuous reference picture designation data to the continuous reference picture designation data sending unit 27, and '0' is sent as the specified reference picture designation data to the specified reference picture designation data sending unit 29.

When instructed by the reference picture designation method control unit 25 to make the one of the plurality of pictures stored in the decoded reference picture memory 24 the reference picture, the decoded reference picture designation method selecting unit 26 switches switch S1 to memory M1 side, and switches S2 to the decoded picture designation data storage unit 28 side. In this manner, in the above case, '0' is sent as the continuous reference picture designation data to the continuous reference picture designation data sending unit 27, and as the specified reference picture designation data, the picture number stored in the decoded picture designation data storage unit 28 is sent to the specified reference picture designation data sending unit 29.

The continuous reference picture designation data sending unit 27 sends continuous reference picture designation data which designates that the latest previously encoded picture be made the reference picture. The decoded picture designation data storage unit 28 stores the picture designation data that the picture designation data receiving unit 21 has received. The specified reference picture designation data sending unit 29 sends specified reference picture designation data which designates that the picture stored in the decoded picture designation data storage unit 28 be made the reference picture.

The error detection unit 30 receives the multiplexed data comprising the encoded reference picture designation data, the picture designation data, and the encoded data sent from the sending side via the transmission line, and when there is an error in the above encoded data in the transmission line, this error is detected. Moreover, this error detection method is carried out using an error detection indicator, and when an error is detected by the error detection unit 30 in the data sent from the sending side, this data is abandoned.

The receiving side multiplexing unit 31 multiplexes the continuous reference picture designation data sent from the continuous reference picture designation data sending unit 27 and the specified reference picture designation data sent from the specified reference picture designation data sending unit 29, and sends them to the sending side. Here, FIG. 5 shows an example of the data format when the picture number '0' is sent in the continuous reference picture designation data, and the picture number '5' is sent in the specified reference picture designation data.

As shown in the figure, the format of the data sent to the sending side from the receiving side arranges in sequence the continuous picture designation data and the specified reference picture designation data. In addition, the picture number of the continuous reference picture designation is represented by 1 bit, and the picture number of the specified reference picture designation is represented by 5 bits. Each of these multiplexed data are demultiplexed by the above-described sending side multiplexing unit 10.

In addition, after the receiving side multiplexing unit 31 demultiplexes each of the multiplexed encoded reference picture designation data, the picture designation data, and the encoded data, each of these data are respectively sent to the reference picture designation data receiving unit 22, the picture designation data receiving unit 21, and the decoding unit 20.

Next, the operation of the video communication system according to the above-described structure is explained.

Moreover, in explaining the operation of the above-described video communication system, the following can be said about the delay period of the data transferred between the sending side and the receiving side.

That is, suppose a one picture delay is produced until the encoded data sent from the sending side arrives at the receiving side, and in addition, a one picture delay is produced by the time the continuous reference picture designation data and the specified reference picture designation data sent from the receiving side arrive at the sending side. Due to this, a two picture delay is produced from the time the sending side sends the encoded data until the receiving side decodes this encoded data, and as result of this decoding, the continuous reference picture designation data and the specified reference picture designation data sent to the sending side are received at the sending side. Moreover, when the encoded data from the sending side is received, the receiving side always sends to the sending side a set of continuous reference picture designation data and specified reference picture designation data.

Below, referring to FIG. 2 and FIG. 3, the operation of the above-described video communication system will be explained separating the cases when there is no error and when there is an error in the encoded data.

[Case in Which There is no Error in the Data Sent From the Sending Side on the Transmission Line]

FIG. 2 shows the operational flow of the sending side and the receiving side in the case in which there is no error in the data sent from the sending side on the transmission line. In this figure, the numbers represent picture numbers. In addition, the numbers shown above the arrows representing the state of sending of encoded data from the sending side to the receiving side show the reference picture designation data of the encoded data, which is to say, the picture number of the reference picture used when encoding.

Here, in the following explanation, we will assume the following conditions of communication as the initial state. First, picture number '1' to picture number '6' are encoded and decoded using the previous picture as the reference picture. That is, when the picture number '6' is encoded, at the sending side, pictures having picture number '1' to picture number '5' are stored in the encoded reference picture memory 3, the picture of picture number '5' is used as the reference picture for encoding the picture of picture number '6', and in this manner, the picture number '5' is stored in the encoded picture designation data storage unit 6.

In contrast, at the receiving side, picture number '1' to picture number '5' are stored in the decoded reference picture memory 24, and in the decoded picture designation data storage unit 28 the picture designation data showing picture number '5' is stored. In addition, the continuous reference picture designation data showing '1' and the specified reference picture designation data showing '0' were respectively sent from the receiving side to the sending side up to reference picture '5'.

Below, in the above-described initial conditions, the process of encoding and decoding is shown for the case in which the receiving side sends to the sending side '0' as the continuous reference picture designation data or the picture number stored in the decoded picture designation data storage unit 28 as the specified reference picture designation data when the encoded data of picture number '6' is decoded and when the encoded data of picture '7' is decoded, and sends to the sending side '1' as the continuous reference picture designation data or '0' as the specified reference picture designation data when the encoded data of picture number '8' to picture number '11' are decoded.

Moreover, reference picture designation method control unit 25, based on the point of view of the user at the receiving side, when the encoded data for picture number '6' and picture number '7' are received, switches from the method of sending a signal from the continuous reference picture designation data sending unit 27 to the method of the decoded picture designation data storage unit 28, and in any other case, switches from the method of sending the signal from the specified reference picture designation data sending unit 29 to the method of sending a signal from the continuous reference picture designation data sending unit 27.

First, the operation of the sending side and the receiving side when the picture of picture number '6' is encoded and this encoded data is decoded is shown as STEP 1 in FIG. 2.

The operation of the sending side is as follows:

When the continuous reference picture designation data receiving unit 7 receives the continuous reference picture designation data showing '1', the encoded reference picture selecting unit 4 selects the picture with picture number '5' stored in the encoded picture designation data storage unit 6 from the encoded reference picture memory 3. In this manner, the encoding unit 1 encodes the input picture with picture number '6' using the picture with picture number '5' selected by the encoded reference picture selecting unit 4 as the reference picture.

In addition, the local decoding unit 2 decodes the above encoded data using the picture with picture number '5' as the reference picture, and stores this decoded picture in the encoded reference picture memory 3. In addition, the picture designation data notification unit 9 sends data showing picture number '6' of the encoded data to the receiving side, and at this time, the data showing picture number '6' is stored in the encoded picture designation data storage unit 6. In addition, the reference picture notification unit 5 sends data showing picture number '5' of the reference picture used on encoding to the receiving side.

The operation of the receiving side is as follows:

In the error detection unit 30, when it is confirmed that no error has been detected in the data sent from the sending side, in the picture designation data receiving unit 21, the received picture data showing picture number '6' of the encoded data is received, and the data showing this picture number '6' is stored in the decoded picture designation data storage unit 28. In addition, in the reference picture designation data receiving unit 22, when the data showing picture number '5' of the reference picture used when encoding is received, the decoded reference picture selecting unit 23 selects the picture with picture number '5' from among the pictures stored in the decoded reference picture memory 24.

In this manner, the decoding unit 20 decodes the encoded data received using the picture with picture number '5' as the reference picture, and sends this to the outside as the sent picture. At the same time, this encoded picture is stored in the decoded reference picture memory 24. In addition, in order that the sending side be instructed to make the picture correctly decoded at the receiving side the reference picture, the reference picture designation method control unit 25 designates the picture designated by the picture designation data stored in the specified reference picture designation data sending unit 29 is made the reference picture to be used when decoding. In this manner, the decoded reference picture designation method selecting unit 26 switches from switch S1 to memory M1 side, and at the same time, the switch S2 is switched to the decoded picture designation data storage unit 28 side. In addition, by the above switching, the data showing picture number '6' stored the decoded picture designation data storage unit 28 from the specified reference picture designation data sending unit 29 is sent to the sending side as specified reference picture designation data. In addition, the continuous reference picture designation data showing '0' is sent to the sending side from the continuous reference picture designation data sending unit 27.

Next, the operation of the sending side and receiving side when the picture with picture number '7' is encoded and this encoded data is decoded is shown as STEP 2 in FIG. 2.

The operation at the sending side is as follows:

When the continuous reference picture designation data receiving unit 7 receives the continuous reference picture designation data showing picture number '1' sent when the encoded data of reference number '4' was decoded at the receiving side, the encoded reference picture selecting unit 4 selects the picture with picture number '6' stored in the encoded picture designation data storage unit 6 from the encoded reference picture memory 3. In this manner, the encoding unit 1 uses as the reference picture the picture with picture number '6' selected by the encoded reference picture selecting unit 4, and encodes the sent picture with the picture number '7'.

Additionally, the local decoding unit 2 decodes the above encoded data using the picture with picture number '6' as the reference picture, and stores this decoded picture in the encoded reference picture memory 3. In addition, the picture designation data notification unit 9 sends data showing picture number '7' of the encoded data to the receiving side, and at this time, the data showing the picture number '7' is stored in the encoded picture designation data storage unit 6.

In addition, the reference picture notification unit 5 sends the data showing picture number '6' of the reference picture used when decoding to the receiving side.

The operation of the receiving side is as follows:

When it is confirmed that no error has been detected in the data sent from the sending side in the error detection unit 30, in the picture designation data receiving unit 21, the picture number '7' of the received encoded data is received, and the data showing this picture number '7' is stored in the decoded picture designation data storage unit 28. In addition, in the reference picture designation data receiving unit 22, when the data showing picture number '6' of the reference picture used when encoding is received, the decoded reference picture selecting unit 23 selects the picture with picture number '6' from among the pictures stored in the decoded reference picture memory 24.

In this manner, the decoding unit 20 decodes the encoded data received using picture with picture number '6' as the reference picture, and sends it to the outside as the sent picture. At the same time, this decoded picture is stored in the decoded reference picture memory 24. In addition, because the reference picture designation method control unit 25 instructs the sending side to make the picture that is correctly decoded at the receiving side the reference picture, the picture designated by the picture designation data stored in the specified reference picture designation data sending unit 29 is designated as the reference picture used when encoding. In this manner, the decoded reference picture designation method selecting unit 26 maintains the switching state of switch S1 and switch S2, and the specified reference picture designation data showing picture number '7' stored in the decoded picture designation data storage unit 28 from the specified reference picture designation data sending unit 29 is sent the sending side, and at the same time, the continuous reference picture designation data showing '0' is sent to the sending side from the continuous reference picture designation data sending unit 27.

Next, the operation of the sending side and receiving side when the picture with picture number '8' is encoded and this encoded data is decoded is shown as STEP 3 in FIG. 2.

The operation of the sending side is as follows:

When the continuous reference picture designation data receiving unit 7 receives the continuous reference picture designation data showing picture number '1' sent when the encoded data of picture number '5' at the receiving side is decoded, the reference picture notification unit 5 selects from the encoded reference picture memory 3 the picture with picture number '7' stored in the encoded picture designation data storage unit 6. In this manner, the encoding unit I encodes the input picture with picture number '8' using the picture with picture number '7' selected by the encoded reference picture selecting unit 4 as the reference picture.

In addition, the local decoding unit 2 decodes the above encoded data using the picture with picture number '7' as the reference picture, and stores this decoded picture with the picture number '8' in the encoded reference picture memory 3. Additionally, the picture designation data notification unit 9 sends the data showing picture number '8' of the encoded data to the receiving side, and at this time, stores the data showing picture number '8' in the encoded picture designation data storage unit 6. In addition, the reference picture notification unit 5 sends the data showing the picture number '7' of the reference picture used in the encoding to the receiving side.

The operation of the receiving side is as follows:

When it is confirmed in the error detection unit 30 that no error has been detected in the data sent from the sending side, in the picture designation data receiving unit 21, the picture number '8' of the received encoded data is received, and the data showing this picture number '8' is stored in the decoded picture designation data storage unit 28. In addition, in the reference picture designation data receiving unit 22, when the picture number '7' of the reference picture used in encoding is received, the decoded reference picture selecting unit 23 selects the picture with picture number '7' from among the pictures stored in the decoded reference picture memory 24.

In this manner, the decoding unit 20 decodes the encoded data received using the picture with picture number '7' as the reference picture, and sends it to the outside as the sent picture. At the same time, this decoded picture is stored in the decoded reference picture memory 24. In addition, in order for the reference picture designation method control unit 25 to instruct the sending side to make the picture correctly decoded by the receiving side the reference picture, the sending side is instructed to make the latest previously encoded picture the reference picture to be used when encoding. In this manner, the decoded reference picture designation method selecting unit 26 switches switch S1 to memory M2 side, and at the same time switches switch S2 to memory M3 side. Additionally, by this switching, the continuous reference picture designation data showing '1' is sent to the sending side from the continuous reference picture designation data sending unit 27, and in addition, specified reference picture designation data showing '0' is sent to the sending side from the specified reference picture designation data sending unit 29.

Next, the operation of the sending side and receiving side when the picture with picture number '9' is encoded, and this encoded data is decoded is shown as STEP 4 in FIG. 2.

The operation of the sending side is as follows:

When the specified reference picture designation data receiving unit 8 receives the specified reference picture designation data of picture number '6' sent when the encoded data of picture number '6' was decoded at the sending side, the encoded reference picture selecting unit 4 selects the picture with picture number '6' showing the above specified reference picture designation data from the encoded reference picture memory 3. In this manner, the encoding unit 1 encodes the input picture with picture number '9' using the picture with picture number '6' selected by the encoded reference picture selecting unit 4 as the reference picture.

In addition, the local decoding unit 2 decodes the above encoded data using the picture with picture number '6' as the reference picture, and this decoded picture is stored in the encoded reference picture memory 3. Additionally, the picture designation data notification unit 9 sends the data showing picture number '9' of the encoded data to the receiving side, and at this time, the data showing picture number '9' is stored in the encoded picture designation data storage unit 6. In addition, the reference picture notification unit 5 sends the data showing the picture number '6' of the reference number used in encoding to the receiving side.

The operation of the receiving side is as follows:

When it is confirmed in the error detection unit 30 that no error has been detected in the data sent from the sending side, in the picture designation data receiving unit 21, the picture number '9' of the received encoded data is received, and the data showing this picture number '9' is stored in the decoded picture designation data storage unit 28. In addition, in the reference picture designation data receiving unit 22, when the data showing the picture number '6' of the reference picture used when encoding is received, the picture with picture number '6' is selected from the pictures stored in the decoded reference picture memory 24.

In this manner, the decoding unit 20 decodes the received encoded data using the picture with picture number '6' as the reference picture, and sends it to the outside as the sent picture. At the same time, this decoded picture is stored in the decoded reference picture memory 24. In addition, in order for the reference picture designation method control unit 25 to instruct the sending side to make the picture correctly decoded by the receiving side the reference picture, the sending side is instructed to make the latest previously encoded picture the reference picture to be used when encoding. In this manner, the decoded reference picture designation method selecting unit 26 maintains the switching state of the switch S1 and the switch S2, and the continuous reference picture designation data showing '1' is sent to the sending side from the continuous reference picture designation data sending unit 27. In addition, the specified reference picture designation data showing '0' is sent to the sending side from the specified reference picture designation data sending unit 29.

Next, the operation of the sending side and the receiving side when the picture with picture number '10' is encoded and this encoded data is decoded is shown as STEP 5 in FIG. 2.

The operation of the sending side is as follows:

When the specified reference picture designation data receiving unit 8 receives the specified reference picture designation data of picture number '7' sent when the encoded data of picture number '7' was decoded at the sending side, the encoded reference picture selecting unit 4 selects the picture with picture number '7' showing the above specified reference picture designation data from the encoded reference picture memory 3. In this manner, the encoding unit 1 encodes the input picture with picture number '10' using the picture with picture number '7' selected by the encoded reference picture selecting unit 4 as the reference picture.

In addition, the local decoding unit 2 decodes the above encoded data using the picture with picture number '7' as the reference picture, and this decoded picture is stored in the encoded reference picture memory 3. Additionally, the picture designation data notification unit 9 sends the data showing picture number '10' of the encoded data to the receiving side, and at this time, the data showing picture number '10' is stored in the encoded picture designation data storage unit 6. In addition, the reference picture notification unit 5 sends the data showing the picture number '7' of the reference number used in encoding to the receiving side.

The operation of the receiving side is as follows:

When it is confirmed in the error detection unit 30 that no error has been detected in the data sent from the sending side, in the picture designation data receiving unit 21, the picture number '10' of the received encoded data is received, and the data showing this picture number '10' is stored in the decoded picture designation data storage unit 28. In addition, in the reference picture designation data receiving unit 22, when the data showing the picture number '7' of the reference picture used when encoding is received, the picture with picture number '7' is selected from the pictures stored in the decoded reference picture memory 24.

In this manner, the decoding unit 20 decodes the received encoded data using the picture with picture number '7' as the reference picture, and sends it to the outside as the sent picture. At the same time, this decoded picture is stored in the decoded reference picture memory 24. In addition, in order for the reference picture designation method control unit 25 to instruct the sending side to make the picture correctly decoded by the receiving side the reference picture, the sending side is instructed to make the latest previously encoded picture the reference picture to be used when encoding. In this manner, the decoded reference picture designation method selecting unit 26 maintains the switching state of the switch S1 and the switch S2, and the continuous reference picture designation data showing '1' is sent to the sending side from the continuous reference picture designation data sending unit 27. In addition, the specified reference picture designation data showing '0' is sent to the sending side from the specified reference picture designation data sending unit 29.

Next, the operation of the sending side and the receiving side when the picture with picture number '11' is encoded and this encoded data is decoded is shown as STEP 6 in FIG. 2.

The operation of the sending side is as follows:

When the continuous reference picture designation data receiving unit 7 receives the continuous reference picture designation data showing picture number '1' sent when the encoded data of picture number '8' at the receiving side is decoded, the reference picture notification unit 5 selects from the encoded reference picture memory 3 the picture with picture number '10' stored in the encoded picture designation data storage unit 6. In this manner, the encoding unit 1 encodes the input picture with picture number '10' using the picture with picture number '11' selected by the encoded reference picture selecting unit 4 as the reference picture.

In addition, the local decoding unit 2 decodes the above encoded data using the picture with picture number '10' as the reference picture, and stores this decoded picture in the encoded reference picture memory 3. Additionally, the picture designation data notification unit 9 sends the data showing picture number '11' of the encoded data to the receiving side, and at this time, stores the data showing picture number '11' in the encoded picture designation data storage unit 6. In addition, the reference picture notification unit 5 sends the data showing the picture number '10' of the reference picture used in the encoding to the receiving side.

The operation of the receiving side is as follows:

When it is confirmed in the error detection unit 30 that no error has been detected in the data sent from the sending side, in the picture designation data receiving unit 21, the picture number '11' of the received encoded data is received, and the data showing this picture number '11' is stored in the decoded picture designation data storage unit 28. In addition, in the reference picture designation data receiving unit 22, when the picture number '10' of the reference picture used in encoding is received, the decoded reference picture selecting unit 23 selects the picture with picture number '10' from among the pictures stored in the decoded reference picture memory 24.

In this manner, the decoding unit 20 decodes the encoded data received using the picture with picture number '10' as the reference picture, and sends it to the outside as the sent picture. At the same time, this decoded picture is stored in the decoded reference picture memory 24. In addition, in order for the reference picture designation method control unit 25 to instruct the sending side to make the picture correctly decoded by the receiving side the reference picture, the sending side is instructed to make the latest previously encoded picture the reference picture to be used when encoding. In this manner, the decoded reference picture designation method selecting unit 26 switches switch S1 to memory M2 side. Additionally, by this switching, the continuous reference picture designation data showing '1' is sent to the sending side from the continuous reference picture designation data sending unit 27, and in addition, specified reference picture designation data showing '0' is sent to the sending side from the specified reference picture designation data sending unit 29.

As shown above, according to the video communication system of the present embodiment, by sending continuous reference picture designation data from the receiving side to the sending side, the receiving side clearly instructs the sending side to encode the input picture using the latest previously encoded picture at the sending side as the reference picture, as in normal inter-frame prediction encoding.

Furthermore, by changing the picture number of the continuous reference picture designation data and the specified reference designation data, the receiving side can indicate from the receiving side whether to make the reference picture used when the sending side carries out encoding either the picture designated by the receiving side or the previous picture.

[The case in Which There is an Error in the Data Sent From the Sending Side Over the Transmission Line]

FIG. 3 shows the operational flow of the sending side and the receiving side in the case that there is an error in the data sent from the sending side on the transmission line. In this figure, the numbers represent picture numbers. In addition, the numbers shown above the arrows representing the state of sending of encoded data from the sending side to the receiving side show the reference picture designation data of the encoded data, which is to say, the picture number of the reference picture used when encoding.

Here, in the following explanation, we will assume the following conditions of communication as the initial state. First, picture number '1' to picture number '6' are the encoding and decoding using the previous picture as the reference picture. That is, when the picture number '6' is encoded, at the sending side, pictures having picture numbers '1' to picture number '5' are stored in the encoded reference picture memory 3, the picture of picture number '5' is used as the reference picture for encoding the picture of picture number '6', and in this manner, the picture number '5' is stored in the encoded picture designation data storage unit 6.

In contrast, at the receiving side, picture number '1' to picture number '5' are stored in the decoded reference picture memory 24, and in the decoded picture designation data storage unit 28 the picture designation data showing picture number '5' is stored. In addition, the continuous reference picture designation data showing '1' and the specified reference picture designation data showing '0' were respectively sent from the receiving side to the sending side up to reference picture '5'.

Furthermore, it is supposed that there is an error in the transmission line when the data including the encoded data of the picture with the picture number '6' is sent from the sending side to the receiving side. In addition, when an error is detected in the encoded data at the error detection unit 30, the reference picture designation method control unit 25 switches from the method wherein a signal is sent from the continuous reference picture designation data sending unit 27 to the method wherein a signal is sent from the specified reference picture designation data sending unit 29, and when no error is discovered in two consecutive frames, it switches from the method wherein a signal is sent from the specified reference picture designation data sending unit 29 to the method wherein a signal is sent from the continuous reference picture designation data sending unit 27.

Below, under the above-described initial conditions, the process of encoding and decoding is shown for the case in which the receiving side sends to the sending side either '0' as the continuous reference picture designation data or the picture number stored in the decoded picture designation data storage unit 28 as the specified reference picture designation data when the encoded data of picture number '6' is decoded and when the encoded data of picture '7' is decoded, and sends to the sending side either '1' as the continuous reference picture designation data or '0' as the specified reference picture designation data when the encoded data of picture number '8' to picture number '11' are decoded.

First, the operation of the sending side and the receiving side when the picture of picture number '6' is encoded and this encoded data is decoded is shown as STEP 1 in FIG. 3.

The operation of the sending side is as follows:

When the continuous reference picture designation data receiving unit 7 receives the continuous reference picture designation data showing '1', the encoded reference picture selecting unit 4 selects the picture with picture number '5' stored in the encoded picture designation data storage unit 6 from the encoded reference picture memory 3. In this manner, the encoding unit 1 encodes the input picture with picture number '6' using the picture with picture number '5' selected by the encoded reference picture selecting unit 4 as the reference picture.

In addition, local decoding unit 2 decodes the above encoded data using the picture with picture number '5' as the reference picture, and stores this decoded picture in the encoded reference picture memory 3. In addition, the picture designation data notification unit 9 sends data showing picture number '6' of the encoded data to the receiving side, and at this time, the data showing picture number '6' is stored in the encoded picture designation data storage unit 6. In addition, the reference picture notification unit 5 sends data showing picture number '5' of the reference picture used on encoding to the receiving side.

The operation of the receiving side is as follows:

In the error detection unit 30, when it is confirmed that an error has been detected in the data sent from the sending side, this data is abandoned. Because of this, in the decoding unit 20 decoding is not carried out, and a decoded picture is not stored in the decoded reference picture memory 24. At this time, because an error has been detected in the data sent from the sending side, the reference picture designation method control unit 25 designates the picture designated by the picture designation data stored in the decoded picture designation data storage unit 28 as the reference picture to be used in decoding.

In this manner, the decoded reference pictire designation method selecting unit 26 switches switch S1 to memory M1 side, and at the same time, the switch S2 is switched to the decoded picture designation data storage unit 28 side. In addition, by the above switching, the data showing picture number '5' stored the decoded picture designation data storage unit 28 from the specified reference picture designation data sending unit 29 is sent to the sending side as specified reference picture designation data. In addition, the continuous reference picture designation data showing '0' is sent to the sending side from the continuous reference picture designation data sending unit 27.

Next, the operation of the sending side and receiving side when the picture with picture number '7' is encoded and this encoded data is decoded is shown in as STEP 2 FIG. 3.

The operation at the sending side is as follows:

When the continuous reference picture designation data receiving unit 7 receives the continuous reference picture designation data showing picture number '1' sent when the encoded data of reference number '4' was decoded at the receiving side, the encoded reference picture selecting unit 4 selects the picture with picture number '6' stored in the encoded picture designation data storage unit 6 from the encoded reference picture memory 3. In this manner, the encoding unit 1 uses as the reference picture the picture with picture number '6' selected by the encoded reference picture selecting unit 4, and encodes the sent picture with the picture number '7'.

Additionally, the local decoding unit 2 decodes the above encoded data using the picture with picture number '6' as the reference picture, and stores this decoded picture in the encoded reference picture memory 3. In addition, the picture designation data notification unit 9 sends data showing picture number '7' of the encoded data to the receiving side, and at this time, the data showing the picture number '7' is stored in the encoded picture designation data storage unit 6. In addition, the reference picture notification unit 5 sends the data showing picture number '6' of the reference picture used when decoding to the receiving side.

The operation of the receiving side is as follows:

When it is confirmed that no error has been detected in the data sent from the sending side in the error detection unit 30, in the picture designation data receiving unit 21, the picture number '7' of the received encoded data is received, and the data showing this picture number '7' is stored in the decoded picture designation data storage unit 28. In addition, in the reference picture designation data receiving unit 22, when the data showing picture number '6' of the reference picture used when encoding is received, the decoded reference picture selecting unit 23 selects the picture with picture number '6' from among the pictures stored in the decoded reference picture memory 24.

However, as described above, because the encoded data of the picture number '6' is not decoded, it is not stored in the decoded reference picture memory 24. Thus, because there is no reference picture to be used for decoding, the decoding unit 20 cannot correctly decode the encoded data of the picture number '7'.

In addition, because an error is not detected in two consecutive frames, the reference picture designation method control unit 25 designates the picture designated by the picture designation data stored in the decoded picture designation data storage unit 28 as the reference picture to be used when decoding. In this manner, the decoded reference picture designation method selecting unit 26 switches switch S1 to memory M1 side, and at the same time switches the switch S2 to the decoded picture designation data storage unit 28 side. Additionally, by these switches, the specified reference picture designation data showing picture number '5' stored in the decoded picture designation data storage unit 28 from the specified reference picture designation data sending unit 29 is sent to the sending side, and in addition, the continuous reference picture designation data showing '0' is sent to the sending side from the continuous reference picture designation data sending unit 27.

Next, the operation of the sending side and receiving side when the picture with picture number '8' is encoded and this encoded data is decoded is shown as STEP 3 in FIG. 3.

The operation of the sending side is as follows:

When the continuous reference picture designation data receiving unit 7 receives the continuous reference picture designation data showing picture number '1' sent when the encoded data of picture number '5' at the receiving side is decoded, the reference picture notification unit 5 selects from the encoded reference picture memory 3 the picture with picture number '7' stored in the encoded picture designation data storage unit 6. In this manner, the encoding unit 1 encodes the input picture with picture number '8' using the picture with picture number '7' selected by the encoded reference picture selecting unit 4 as the reference picture.

In addition, the local decoding unit 2 decodes the above encoded data using the picture with picture number '7' as the reference picture, and stores this decoded picture with the picture number '8' in the encoded reference picture memory 3. Additionally, the picture designation data notification unit 9 sends the data showing picture number '8' of the encoded data to the receiving side, and at this time, stores the data showing picture number '8' in the encoded picture designation data storage unit 6. In addition, the reference picture notification unit 5 sends the data showing the picture number '7' of the reference picture used in the encoding to the receiving side.

The operation of the receiving side is as follows:

When it is confirmed in the error detection unit 30 that no error has been detected in the data sent from the sending side, in the picture designation data receiving unit 21, the picture number '8' of the received encoded data is received, and the data showing this picture number '8' is stored in the decoded picture designation data storage unit 28. In addition, in the reference picture designation data receiving unit 22, when the picture number '7' of the reference picture used in encoding is received, the decoded reference picture selecting unit 23 selects the picture with picture number '7' from among the pictures stored in the decoded reference picture memory 24.

However, as described above, because the encoded data of the picture number '7' is not decoded, it is not stored in the decoded reference picture memory 24. Thus, because there is no reference picture to be used for decoding, the decoding unit 20 cannot correctly decode the encoded data of the picture number '8'.

In addition, because an error is not detected in two consecutive frames, the reference picture designation method control unit 25 designates the previous picture as the reference picture to be used when decoding. In this manner, the decoded reference picture designation method selecting unit 26 switches switch S1 to memory M2 side, and at the same time switches the switch S2 to memory M3 side. Additionally, by these switches, the continuous reference picture designation data showing '1' is sent to the sending side from the continuous reference picture designation data sending unit 27, and additionally, specified reference picture designation data showing '0' is sent to the sending side from the specified reference picture designation data sending unit 29.

Next, the operation of the sending side and receiving side when the picture with picture number '9' is encoded, and this encoded data is decoded is shown in FIG. 3 as STEP 4.

The operation of the sending side is as follows:

When the specified reference picture designation data receiving unit 8 receives the specified reference picture designation data of picture number '5' sent when the decoding of the encoded data of picture number '6' was attempted at the sending side, the encoded reference picture selecting unit 4 selects the picture with picture number '5' showing the above specified reference picture designation data from the encoded reference picture memory 3. In this manner, the encoding unit 1 encodes the input picture with picture number '9' using the picture with picture number '5' selected by the encoded reference picture selecting unit 4 as the reference picture.

In addition, the local decoding unit 2 decodes the above encoded data using the picture with picture number '5' as the reference picture, and this decoded picture is stored in the encoded reference picture memory 3. Additionally, the picture designation data notification unit 9 sends the data showing picture number '9' of the encoded data to the receiving side, and at this time, the data showing picture number '9' is stored in the encoded picture designation data storage unit 6. In addition, the reference picture notification unit 5 sends the data showing the picture number '5' of the reference number used in encoding to the receiving side.

The operation of the receiving side is as follows:

When it is confirmed in the error detection unit 30 that no error has been detected in the data sent from the sending side, in the picture designation data receiving unit 21, the picture number '9' of the received encoded data is received, and the data showing this picture number '9' is stored in the decoded picture designation data storage unit 28. In addition, in the reference picture designation data receiving unit 22, when the data showing the picture number '5' of the reference picture used when encoding, the picture with picture number '5' is selected from the pictures stored in the decoded reference picture memory 24.

In this manner, the decoding unit 20 decodes the received encoded data using the picture with picture number '5' as the reference picture, and sends it to the outside as the sent picture. At the same time, this decoded picture is stored in the decoded reference picture memory 24. In addition, because no error has been detected in two consecutive frames, the reference picture designation method control unit 25 designates the latest previously encoded picture as the reference picture to be used when decoding.

In this manner, the decoded reference picture designation method selecting unit 26 maintains the switching state of switch S1 and the switch S2, and continuous reference picture designation data showing a '1' is sent to the sending side, and in addition, specified reference picture designation data showing a '0' is sent to the sending side.

Next, the operation of the sending side and the receiving side when the picture with picture number '10' is encoded and this encoded data is decoded is shown as STEP 5 in FIG. 3.

The operation of the sending side is as follows:

When the specified reference picture designation data receiving unit 8 receives the specified reference picture designation data of picture number '5' sent when the decoding of the encoded data of picture number '7' was attempted at the sending side, the encoded reference picture selecting unit 4 selects the picture with picture number '5' showing the above specified reference picture designation data from the encoded reference picture memory 3. In this manner, the encoding unit 1 encodes the input picture with picture number '10' using the picture with picture number '5' selected by the encoded reference picture selecting unit 4 as the reference picture.

In addition, the local decoding unit 2 decodes the above encoded data using the picture with picture number '5' as the reference picture, and this decoded picture is stored in the encoded reference picture memory 3. Additionally, the picture designation data notification unit 9 sends the data showing picture number '10' of the encoded data to the receiving side, and at this time, the data showing picture number '10' is stored in the encoded picture designation data storage unit 6. In addition, the reference picture notification unit 5 sends the data showing the picture number '5' of the reference number used in encoding to the receiving side.

The operation of the receiving side is as follows:

When it is confirmed in the error detection unit 30 that no error has been detected in the data sent from the sending side, in the picture designation data receiving unit 21, the picture number '10' of the received encoded data is received, and the data showing this picture number '10' is stored in the decoded picture designation data storage unit 28. In addition, in the reference picture designation data receiving unit 22, when the data showing the picture number '5' of the reference picture used when encoding, the picture with picture number '5' is selected from the pictures stored in the decoded reference picture memory 24.

In this manner, the decoding unit 20 decodes the received encoded data using the picture with picture number '5' as the reference picture, and sends it to the outside as the sent picture. At the same time, this decoded picture is stored in the decoded reference picture memory 24. In addition, because no error has been detected in two consecutive frames, the reference picture designation method control unit 25 designates the latest previously encoded picture as the reference picture to be used when encoding.

In this manner, the decoded reference picture designation method selecting unit 26 maintains the switching state of switch 1 and switch 2, and continuous reference designation data showing '1' is sent to the sending side, and in addition, specified reference picture designation data showing '0' is sent to the sending side.

Next, the operation of the sending send and the receiving side when the picture with picture number '11' is encoded, and its encoded data is decoded is shown as STEP 6 in FIG. 3.

The operation of the sending side is as follows:

When the continuous reference picture designation data receiving unit 7 receives the continuous reference picture designation data showing picture number '1' sent when the encoded data of picture number '8' at the receiving side is decoded, the encoded reference picture selecting unit 4 selects from the encoded reference picture memory 3 the picture with picture number '10' stored in the encoded picture designation data storage unit 6. In this manner, the encoding unit 1 encodes the input picture with picture number '10' using the picture with picture number '11' selected by the encoded reference picture selecting unit 4 as the reference picture.

In addition, the local decoding unit 2 decodes the above encoded data using the picture with picture number '10' as the reference picture, and stores this decoded picture (picture number '11') in the encoded reference picture memory 3. Additionally, the picture designation data notification unit 9 sends the data showing picture number '10' of the encoded data to the receiving side, and at this time, stores the data showing picture number '10' in the encoded picture designation data storage unit 6. In addition, the reference picture notification unit 5 sends the data showing the picture number '10' of the reference picture used in the encoding to the receiving side.

The operation of the receiving side is as follows:

When it is confirmed in the error detection unit 30 that no errors are detected in the data sent from the sending side, in the picture designation data receiving unit 21, the picture number '11' of the received encoded data is received, and the data showing this picture number '11' is stored in the decoded picture designation data storage unit 28. In addition, in the reference picture designation data receiving unit 22, when the picture number '10' of the reference picture used in encoding is received, the decoded reference picture selecting unit 23 selects the picture with picture number '10' from among the pictures stored in the decoded reference picture memory 24.

In this manner, the decoding unit 20 decodes the encoded data received using the picture with picture number '10' as the reference picture, and sends it to the outside as the sent picture. At the same time, this decoded picture is stored in the decoded reference picture memory 24. In addition, because no error has been detected in two consecutive frames, the reference picture designation method control unit 25 designates the latest previously encoded picture as the reference picture to be used when encoding.

In this manner, the decoded reference picture designation method selecting unit 26 maintains the switching state of switch S1 and switch S2, and the continuous reference picture designation data showing '1' is sent to the sending side from the continuous reference picture designation data sending unit 27, and in addition, the specified reference picture designation data showing '0' is sent to the sending side from the specified reference picture designation data sending unit 29.

As shown above, according to the video communication system of the present embodiment, even when there is an error in the data sent from the sending side to the receiving side, the receiving side can clearly designate encoding using the latest previously encoded picture as the reference picture, like the normal inter-frame prediction encoding, to the sending side by sending continuous reference picture designation data from the receiving side. Furthermore, by changing the picture number of the continuous reference picture designation data and the specified reference designation data, the receiving side can indicate whether to make the reference picture used when the sending side carries out encoding the picture designated by the receiving side or the previous picture.

Second Embodiment

Next, an embodiment is shown of the case wherein, in the video communication system shown in the above-described first embodiment, the function of encoding the present picture using the continuous reference picture designation data or the specified reference picture designation data used when encoding the previous picture, at the sending side, when the continuous reference picture designation data and the specified reference designation data cannot be received by the receiving side between the time the encoding of the previous picture commences and the time the encoding of the present picture commences.

Figure 6:
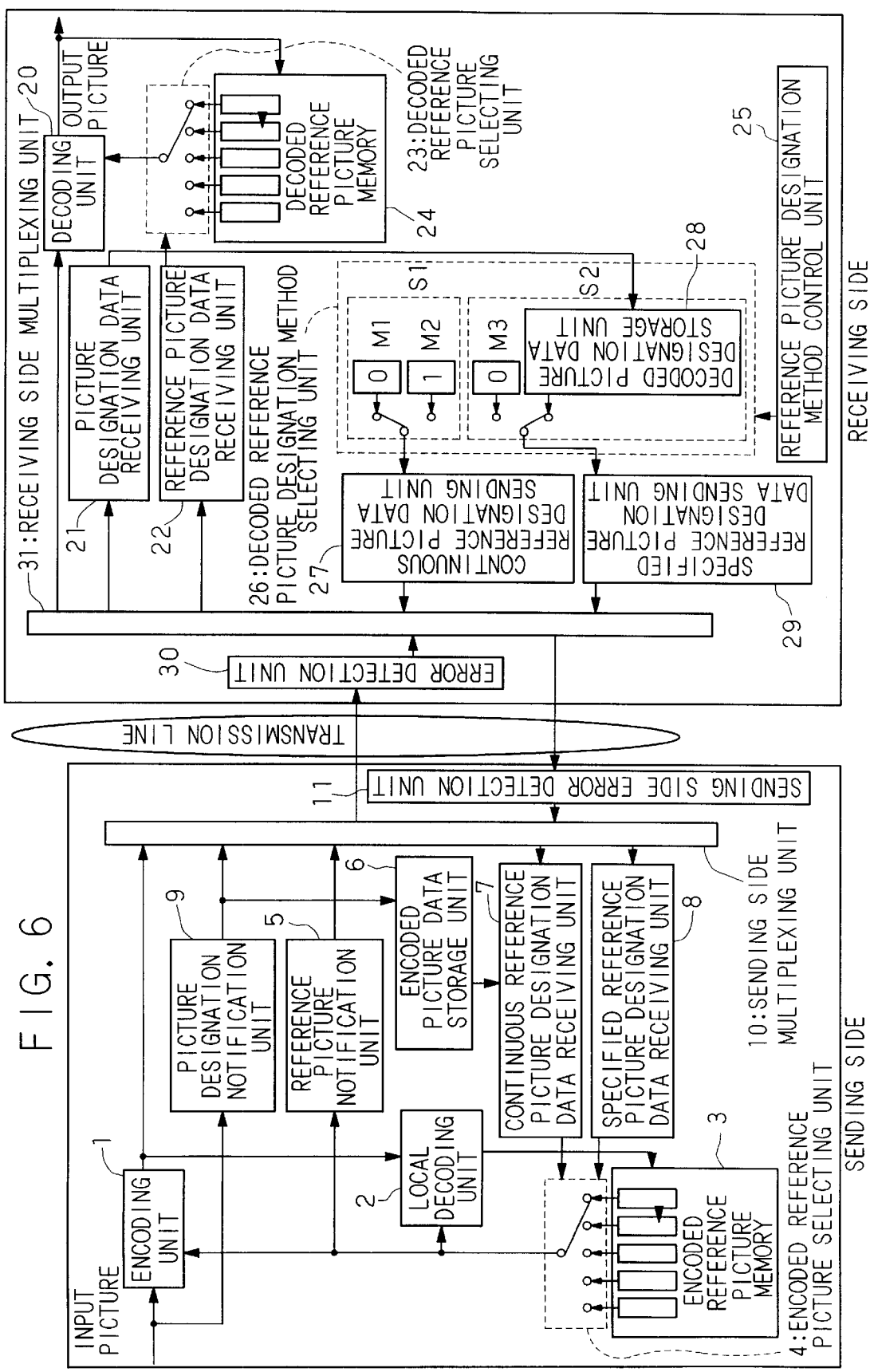
FIG. 6 is a block diagram showing a structure of the video communication system according to the second embodiment of the present invention.

FIG. 6 is a block diagram showing the structure of the video communication system according to the present embodiment. In this figure, components which are the same as those in FIG. 1 have the same reference number, and their detailed explanation is omitted. The point on which the video communication system shown in FIG. 6 differs from that in FIG. 1 is that at the sending side a sending side error detection unit 11 which detects errors in the continuous reference picture designation data and the specified reference picture designation data from the receiving side.

In addition, the continuous reference picture designation data receiving unit 7 at the sending side maintains the last continuous reference picture designation data received until the next continues reference picture designation data is sent after receiving any given continuous reference picture designation data, and when the continuous reference picture designation data receiving unit 7 receives the next continuous reference picture designation data, the maintained continuous reference picture designation data is abandoned.

In the same manner, the specified reference picture designation data receiving unit 8 maintains the last specified reference picture designation data received until receiving the next specified reference picture designation data is sent after receiving any given specified reference picture designation data, and when the specified reference picture designation data receiving unit 8 receives the next specified reference picture designation data, the maintained specified reference picture designation data is abandoned.

The operation in the case that there is a transmission error on the transmission line in the continuous reference picture designation data or the specified reference picture designation data sent from the sending side will be explained with the kind of structure.

Here, we assume the same initial conditions as the case when there was an error in the sent data sent from the sending side explained referring to FIG. 3 in the above-described first embodiment, and the example is explained wherein there is an error in the data on the transmission line when the sending side sends to the receiving side data which includes encoded data of the picture with picture number '6', in the video communication system of the present embodiment.

Figure 7:
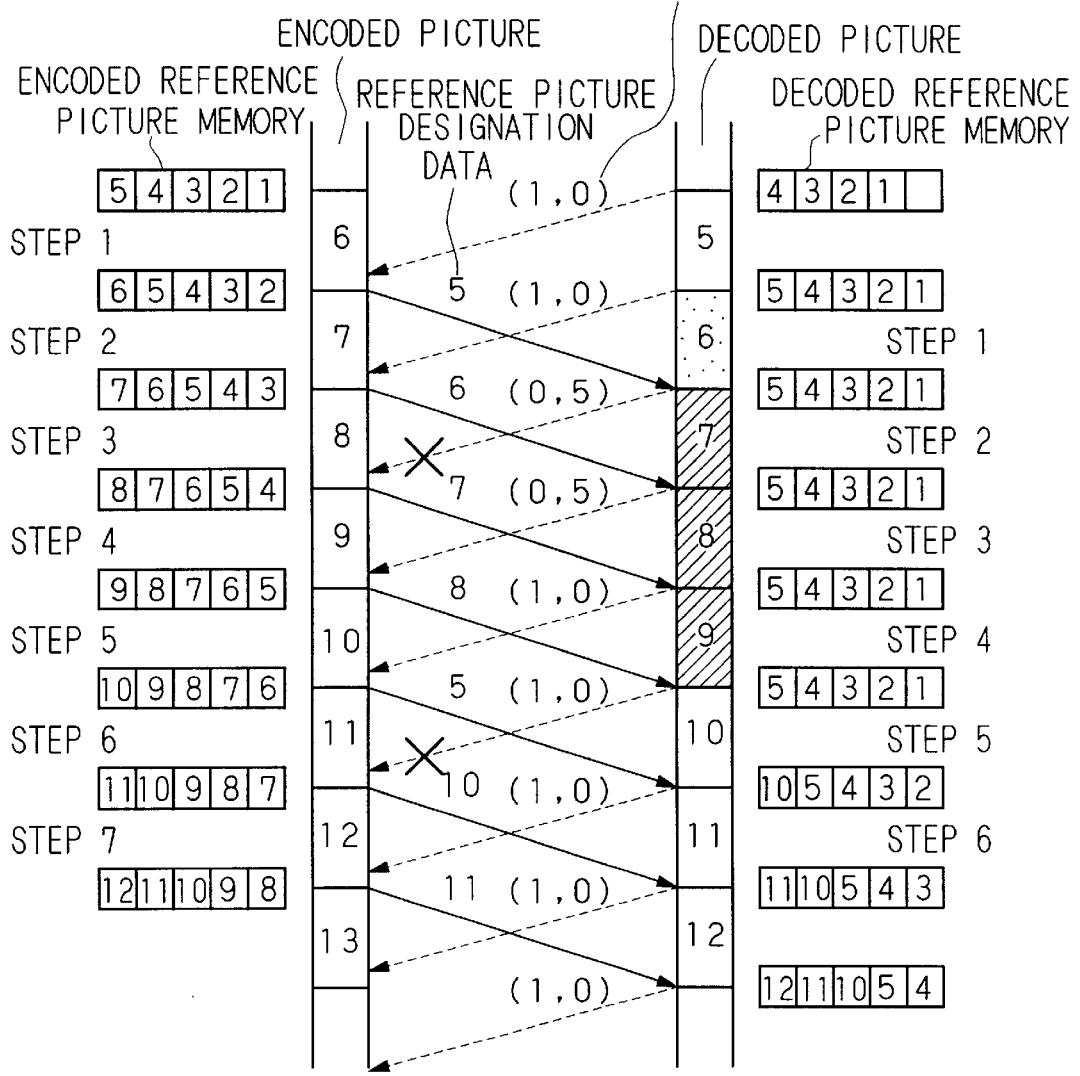
FIG. 7 shows an example of the operation when there is no error in the encoded data in the above video communication system.

In addition, in the following explanation referring to FIG. 7, the operation at the sending side in the case that there is an error on the transmission line in the specified reference picture designation data sent from the sending side in the step of encoding processing at the receiving side of the encoded data of the picture number '6' (in FIG. 7, the operation of STEP 4), and the operation at the sending side in the case there is an error on the transmission line in the continuous reference picture designation data sent from the sending side in the step of encoding processing at the receiving side of the encoded data of the picture number '9' (in FIG. 7, the operation of STEP 7) are explained.

First, in STEP 4, in which the sending side encoded the picture with picture number '9', in the case that there is an error in the specified reference picture designation data showing picture number '6' dent from the receiving side, when the sending side error detection unit 11 detects this error, the received specified reference picture designation data is abandoned. At this time, the continuous reference picture designation data receiving unit 7 maintains the sent continuous reference picture designation data showing '1' in STEP 3. In this manner, the encoded reference picture selecting unit 4 selects the picture with picture number '8' stored in the encoded picture designation data storage unit 6 from the encoded reference picture memory 3 as the reference picture to be used when encoding the input picture with picture number '7'. Additionally, the encoding unit encoded the input with picture number '9' making the picture with picture number '8' the reference picture.

In addition, in the local decoding unit 2, the above encoded data using picture with picture number '8' as the reference picture is decoded, and this decoded picture (picture number '8') is stored in the encoded reference picture memory 3. The picture designation data notification unit 9 sends the data showing picture number '9' of the encoded data to the receiving side, and at this time, the data showing picture number '9' is stored in the encoded picture designation data storage unit 6. In addition, the reference picture notification unit 5 sends the data showing picture number '8' of the reference picture used in encoding to the receiving side.

In contrast, at the receiving side, in the error detection unit 30, when it is confirmed that no error has been detected in the data sent from the sending side, in the picture designation data receiving unit 21 the data showing the picture number '9' of the received encoded data is received, and the data showing this picture number '9' is stored in the decoded picture designation data storage unit 28. In addition, in the reference picture designation data receiving unit 22, the data showing the picture number '8' of the reference picture used when encoding is received, but because the picture number '8' is not stored in the decoded reference picture memory 24, in the decoded reference picture selecting unit 23, the reference picture cannot be selected. Thus, the decoding unit 20 cannot correctly decode the encoded data since there is no reference picture.

In addition, because two consecutive errors are not detected, the reference picture designation method control unit 25 designates the latest previously encoded picture as the reference picture to be used when encoding. In this manner, the decoded reference picture designation method selecting unit 26 maintains in the present state as is the switching state of the switch S1 and the switch S2. Thus, from the continuous reference picture designation data sending unit 27, the continuous reference picture designation data showing '1' is sent to the sending side, and from the specified reference picture designation data sending unit 29, the specified reference picture designation data showing '0' is sent to the sending side.

Next, in STEP 7, in which the sending side encodes the picture with picture number '12', in the case that there are errors in the continuous reference picture designation data showing '1' sent from the receiving side and the specified reference picture designation data showing '0', then the sending side error detection unit 11 detects these errors, this sent continuous reference picture designation data and specified reference picture designation data are abandoned. At this time, the continuous reference picture designation data receiving unit 7 maintains the picture number '1' which is the continuous reference picture designation data received in STEP 6. In this manner, the encoded reference picture selecting unit 4 selects the picture with picture number '11' stored in the encoded picture designation data storage unit 6 from the encoded reference picture memory 3 as the reference picture to be used when encoding the input picture with picture number '12'. Additionally, the encoding unit encodes the input picture with picture number '12' making the picture with picture number '11' the reference picture.

In addition, the local decoding unit 2 decodes the above encoded data using the picture with picture number '11' as the reference picture, and stores this decoded picture (picture number '12') in the encoded reference picture memory 3. Additionally, the picture designation data notification unit 9 sends the data showing picture number '12' of the encoded data to the receiving side, and at this time, the data showing picture number '12' is stored in the encoded picture designation data storage unit 6. Additionally, the data showing the picture number '12' of the reference picture used when encoding is sent to the receiving side.

In contrast, at the receiving side, in the error detection unit 30, when it is confirmed that there has been no error in the data sent from the sending side, in the picture designation data receiving unit 21, the data showing the picture number '12' of the received encoded data is received, and the data showing this picture number '12' is stored in the decoded picture designation data storage unit 28. In addition, in the reference picture designation data receiving unit 22, when the data showing the picture number '11' of the reference picture used when encoding is sent, the decoded reference picture selecting unit 23 selects the picture with picture number '11' from the pictures stored in the decoded reference picture memory 24.

In this manner, the decoding unit 20 decoded the encoded data sent using the picture with picture number '11' as the reference picture, and at the same time, this decoded picture is stored in the decoded reference picture memory 24. In addition, in order for the reference picture designation method control unit 25 to instruct the sending side to make the picture correctly decoded by the receiving side the reference picture, the sending side is instructed to make the latest previously encoded picture the reference picture to be used when encoding.

In this manner, the decoded reference picture designation method selecting unit 26 maintains in the present state as is the switching state of the switch S1 and the switch S2. Thus, from the continuous reference picture designation data sending unit 27, the continuous reference picture designation data showing '1' is sent to the sending side, and in addition, from the specified reference picture designation data sending unit 29, the specified reference picture designation data showing '0' is sent to the sending side.

Figure 8:
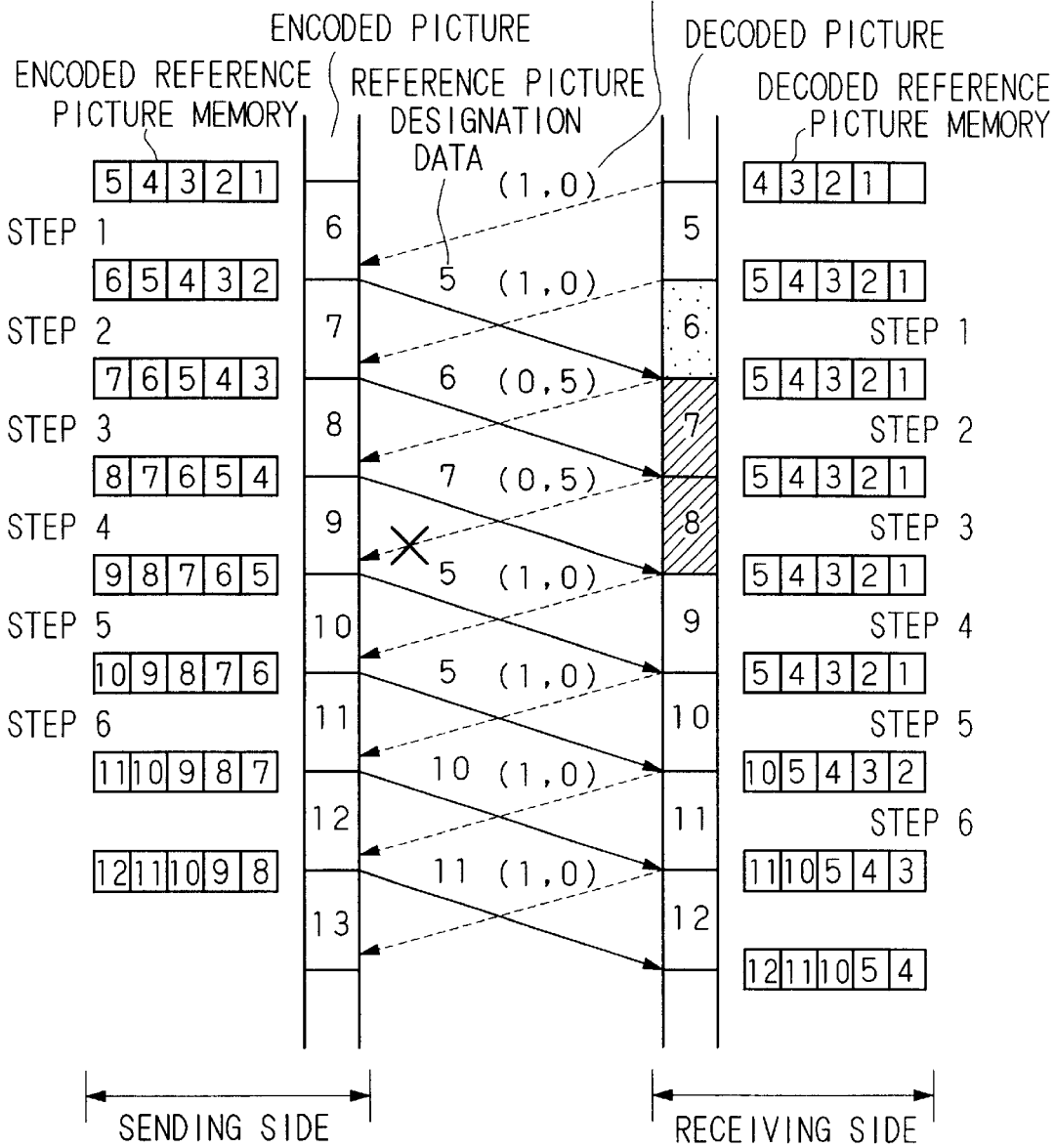
FIG. 8 shows an example of the operation when there is an error in the encoded data in the above video communication system.

Next, referring to the operation flow shown in FIG. 8, the case showing an example of the operation at the sending side when there is an error in the step of the decoding of the encoded data of the picture number '7' sent from the receiving side to the sending side on the transmission line. Moreover, the initial conditions in the operation flow shown in FIG. 8 are the same initial conditions as when there is an error in the sent data sent from the sending side explained referring to FIG. 3 in the above-described first embodiment.

In STEP 5, in which the sending side encodes the picture with picture number '10', when there is an error on the transmission line in the specified reference picture designation data showing picture number '5' sent when the encoded data with picture number '7' is decoded at the receiving side, at the receiving side, when this error is detected by the sending side error detection unit 11, this received specified reference picture designation data is abandoned. At this time, the continuous reference picture designation data receiving unit 7 and the specified reference picture designation data receiving unit 8 continue to maintain respectively the continuous reference picture designation data showing '0' and the specified reference picture designation data showing picture number '5' received in STEP 4. In this manner, the encoded reference picture selecting unit 4 selects the picture with picture number '5' from the encoded reference picture memory 3. Additionally, the encoding unit encodes the picture with picture number '10' by using the picture with picture number '5' as the reference picture.

In addition, the local decoding unit 2 decodes the above encoded data using the picture with picture number '5' as the reference picture, and this decoded picture number '10' is stored in the encoded reference picture memory 3. The picture designation data notification unit 9 sends the data showing picture number '10' of the encoded data sent from the sending side, and at this time, stores the data showing picture number '10' in the encoded picture designation data storage unit 6. In addition, the reference picture notification unit 5 sends the data showing picture number '5' of the reference picture used when encoding to the receiving side.

In contrast, at the receiving side, when it is confirmed that no error has been detected in the data sent from the sending side in the error detection unit 30, in the picture designation data receiving unit 21, the picture number '10' of the received encoded data is received, and this data showing the picture number '10' is stored in the decoded picture designation data storage unit 28. In addition, in the reference picture designation data receiving unit 22, when the data showing the picture number '5' of the reference picture used when encoding is received, the decoded reference picture selecting unit 23 selects the picture with picture number '5' from the pictures stored in the decoded reference picture memory 24.

Additionally, the decoding unit 20 decodes the received encoded data using the picture with picture number '5' as the reference picture, and sends it to the outside as the sent picture. At the same time, this picture is stored in the decoded reference picture memory 24. In addition, because two consecutive errors are not detected, the reference picture designation method control unit 25 designates the latest previously encoded picture as the reference picture to be used when encoding to the sending side.

In this manner, the decoded reference picture designation method selecting unit 26 maintains as is the switching state of switch S1 and switch S2. Thus, from the continuous reference picture designation data sending unit 27, the picture number '1' is sent to the sending side as the continuous reference picture designation data, and additionally from the specified reference picture designation data sending unit 29, picture number '0' is sent to the sending side as the specified reference picture designation data.

As shown in the above, even when there is an error on the transmission line in the continuous reference picture designation data or specified reference picture designation data sent from the receiving side to the sending side, by changing the picture number of the continuous reference picture designation data and specified reference picture designation data, it is possible to change whether the picture designated from the receiving side is made the reference picture, or the previous picture is made the reference picture.

Third Embodiment

Next referring to FIG. 9 through FIG. 13 the third embodiment of the present invention is explained.

Figure 9:
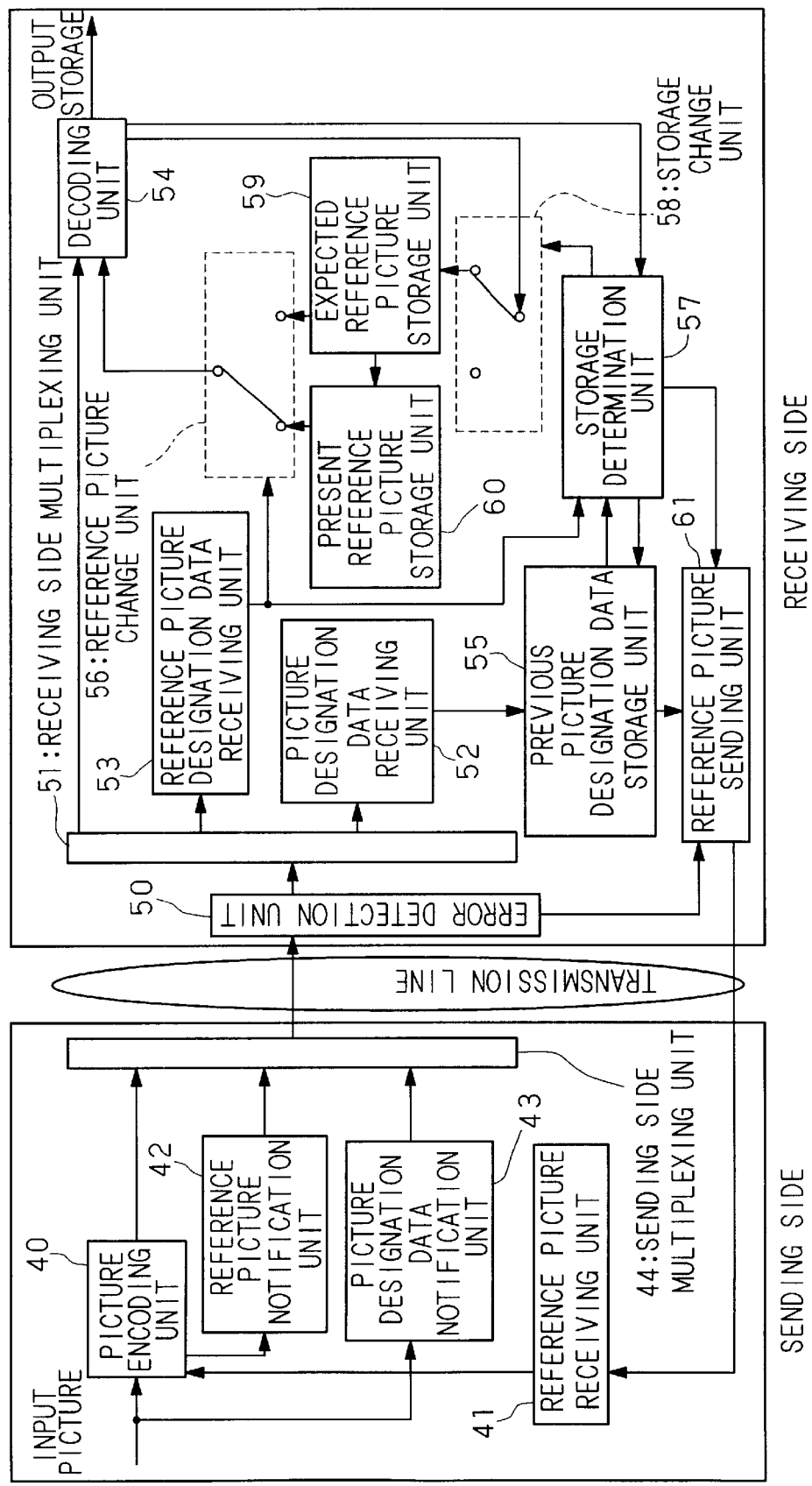
FIG. 9 is a block diagram showing the structure of the video communication system according to the third embodiment of the present invention.

FIG. 9 is a structural diagram showing the embodiment of the present invention. At the sending side shown in this figure, the picture encoding unit 40 selects from the internal reference picture memory (not shown) the picture with the picture number designated by the encoding reference picture designation data (explained below) from the receiving side received by the reference picture receiving unit 41, and using the this selected picture as the reference picture, encodes the input pictures supplied sequentially from the outside. Here, the memory capacity of the internal reference picture memory in the picture encoding unit 40 is five pictures, and the encoded pictures are re-decoded, and stored in sequence. In addition, when more than 5 pictures are stored, the oldest stored picture is deleted except for the reference picture used when encoding.

The reference picture notification unit 42 sends the reference picture designation data showing the picture number of the reference picture used when encoding the encoded data sent from the picture encoding unit 40. The picture designation data notification unit 43 sends the picture designation data showing the picture number of the input picture encoded by the picture encoding unit 40. The sending side multiplexing unit 44 multiplexes the encoded data sent from the picture encoding unit 40, the reference picture designation data sent from the reference picture notification unit 42, and the picture designation data sent from the picture designation data notification unit 43, and sends them to the receiving side.

Figure 12:
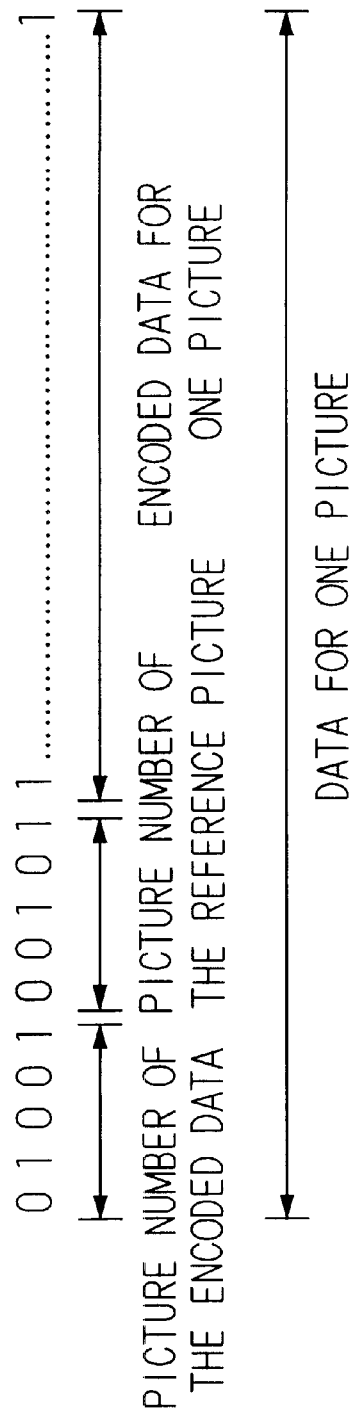
FIG. 12 shows an example of the format of the data sent from the sending side to the receiving side in the above video communication system.

Here, FIG. 12 shows the format of the data sent to the receiving side from the sending side multiplexing unit 44. As shown in this figure, the arrangement of the format of the data sent to the receiving side is, in order: the picture designation data (the picture number of the encoded data), the reference picture designation data (the picture number of the reference picture used when encoding), and the encoded data of one picture sent from the picture encoding unit 40. Moreover, it is assumed in FIG. 12 that the picture designation data shows picture number '9', and the reference picture designation data shows picture number '5', and each picture number is represented by 5 bits.

Next, at the receiving side, the error detection unit 50 receives the data sent via the transmission line from the sending side, and detects errors in the data received on the transmission line. This error detection method is carried out using the error detection indicator, and received data in which an error has been discovered is abandoned. The receiving side multiplexing unit 51 demultiplexes data which the error detection unit 50 receives into the picture designation data, the reference picture designation data, and the encoded data, and respectively sends them to the picture designation data receiving unit 52, the reference picture designation data receiving unit 53, and the decoding unit 54.

The picture designation data receiving unit 52 receives the picture designation data sent from the receiving side multiplexing unit 51, and sends it to the previous picture designation data storage unit 55. In this manner, the previous picture designation data storage unit 55 updates and stores the already stored picture designation data. The reference picture designation data receiving unit 53 receives the reference picture designation data sent from the receiving side multiplexing unit 51, and sends it to the reference picture change unit 56 and the storage determination unit 57. The reference picture change unit 56 sends to the decoding unit 54 the picture with picture number shown by the reference picture designation data that the reference picture designation data receiving unit 53 received from among each of the pictures stored in the expected reference picture storage unit 59 and the present reference picture storage unit 60, described below.

In this manner, the decoding unit 54 decodes the encoded data sent from the receiving side multiplexing unit 51 making the picture sent from the reference picture change unit 56 the reference picture. In addition, the decoding unit 54 sends to the outside the decoded picture as the sent picture, and at the same time, sends it to the storage change unit 58, described below.

The storage determination unit 57 compares the picture designation data stored in the previous picture designation data storage unit 55 with the reference picture designation data sent from the reference picture designation data receiving unit 53, and in the case that they match, determines that the decoded picture sent from the decoding unit 54 will be stored in the expected reference picture storage unit 59. When the storage determination unit 57 determines that the decoded picture sent from the decoding unit 54 will be stored in the expected reference picture storage unit 59, the storage change unit 58 sends the decoded picture sent from the decoding unit 54 to the expected reference picture storage unit 59.

When the decoded picture is sent from the storage change unit 58, the expected reference picture storage unit 59 stores the decoded picture sent from the storage change unit 58 after the already stored picture is transferred to the present reference picture storage unit 60. In the case that the picture is transferred from the expected reference picture storage unit 59, the present reference picture storage unit 60 updates the already stored picture to the transferred picture. The reference picture sending unit 61 makes the picture designation data stored in the previous picture designation data storage unit 55 the encoding reference picture designation data, which designates the reference picture to be used in encoding, and always sends this to the sending side. In this manner, the sending side is notified of the picture number of the picture stored in the expected reference picture storage unit 59.

Figure 13:
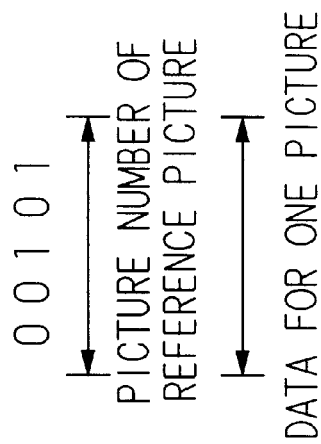
FIG. 13 shows an example of the format of the data sent from the receiving side to the sending side in the above video communication system.

Here, the contents of the data sent to the sending side from the reference picture sending unit 61 are only the contents designation the picture number of the picture used as the reference picture when decoding at the sending side. Here, FIG. 13 shows the format of this data when the receiving side instructs the sending side to use the picture with picture number '5' as the reference picture. As shown in FIG. 13, in the present embodiment the picture number of the reference picture used when encoding is represented with 5 bits.

Next, the operation of the video communication system according to the above-described structure is explained.

Moreover, in explaining the operation of the above video communication system, the delay time when data communication is carried out between the sending side and the receiving side can be described as follows. A one picture delay is produced by the time the encoded data sent from the sending side arrives at the receiving side, and there is a one frame delay by the time the encoded reference picture designation data sent from the receiving side arrives. Due to this, after the sending side sends the encoded data, the receiving side decodes this encoded data, and as a result of this decoding, by the time that the encoded reference picture designation data is sent to the sending side and received by the sending side, a delay of two pictures is produced.

Moreover, when encoded data is received from the sending side, the receiving side always sends one set of the encoding reference picture designation data to the sending side.

Below, referring to FIG. 10 and FIG. 11, the cases of there being no error and there being some error in the encoded data on the transmission line are separated, and the operation of the above-described video communication system is explained.

[Case in Which There is no Error in the Data Sent From the Sending Side on the Transmission Line]

Figure 10:
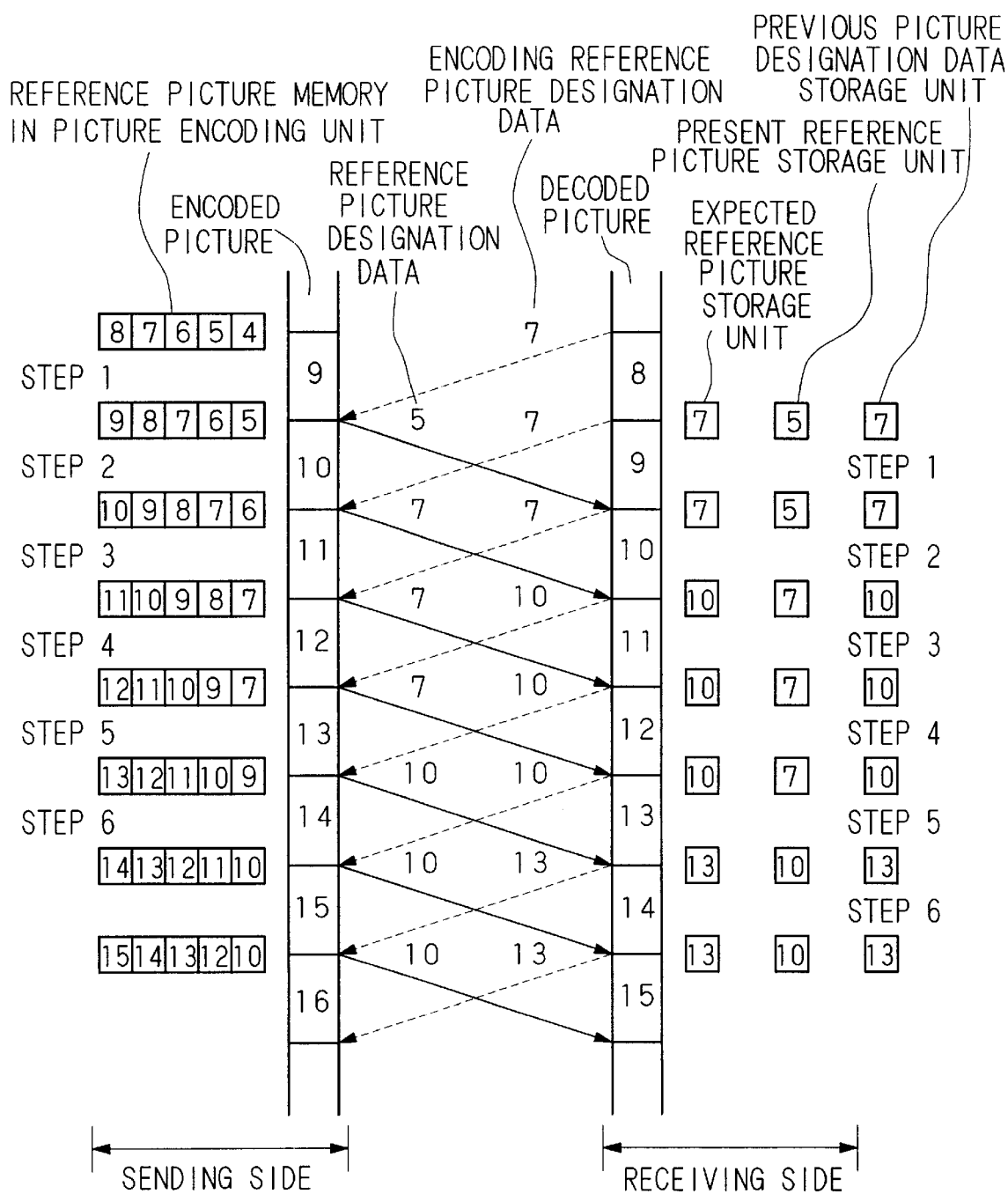
FIG. 10 shows an example of the operation where there is no error in the encoded data in the above video communication system.

FIG. 10 shows the operational flow of the sending side and the receiving side in the case in which there is no error in the data sent from the sending side on the transmission line. In this figure, the numbers represent picture numbers. In addition, the numbers shown above the arrows representing the state of sending of encoded data from the sending side to the receiving side show reference picture designation data of the encoded data, which is to say, the picture number of the reference picture used when encoding.

Here, in the following explanation, the following state during communication is assumed as the initial condition.

First, at the receiving side, the picture with picture number '5' is stored in the present reference picture storage unit 60, and the picture with picture number '7' is stored in the expected reference picture storage unit 59. In addition, in the previous picture designation data storage unit 55, the picture number '7' of the picture stored in the expected reference picture storage unit 59 is stored. Furthermore, because the picture number stored in the previous picture designation data storage unit 55 is sent to the sending side, under the initial conditions the reference picture sending unit 61 sends to the sending side the picture number '7' as the encoded reference picture designation data. In addition, at this time, at the sending side, encoding of the input picture using the picture with picture number '5' as the reference picture is carried out.

Under the above-described initial conditions, the process of the video communication system of the present embodiment encoding and decoding from picture number '9' to picture number '14' is explained.

First, the operation of the sending side and the receiving side when decoding this encoded data is explained as STEP 1 in FIG. 10.

The operation of the sending side is as follows:

When the reference picture receiving unit 41 receives the encoded reference picture designation data sent from the receiving side, and the picture number '5' shown by the encoded reference picture designation data is designated the reference picture to be used when encoding, the picture encoding unit 40 encodes the input picture with picture number '9' using the picture number '5' as the reference picture. In this manner, the picture designation data notification unit 43 sends picture designation data showing picture number '9', and the reference picture notification unit 42 sends reference picture designation data showing picture number '5' to the receiving side.

The operation of the receiving side is as follows:

When it has been confirmed by the error detection unit 50 that there has been no error in the data sent from the sending side, in the picture designation data receiving unit 52, the picture designation data showing the picture number '9' of the received encoded data. In addition, when the reference picture designation data receiving unit 53 receives the reference picture designation data showing picture number '5', the reference picture change unit 56 will sent the picture with picture number '5' stored in the present reference picture storage unit 60 as the reference picture to the decoding unit 54, and switches the switch. In this manner, the decoding unit 54 makes the picture with picture number '5' sent from the reference picture change unit 56 the reference picture, and decodes the encoded data of the received picture number '9'.

In addition, the reference picture designation data that the reference picture designation data receiving unit 53 receives is also sent to the storage determination unit 57, and in the storage determination unit 57, the reference picture designation data showing the received picture number '5' and the data showing picture number '7' stored in the previous picture designation data storage unit 55 are compared. When it is determined by this comparison that they do not match, the storage change unit 58 does not store the decoded picture with the picture number '9' decoded by the decoding unit 54 in the expected reference picture storage unit 59.

In addition, in the previous picture designation data storage unit 55, the data showing the picture number '7' received by the picture designation data receiving unit 52 is stored as is, and in this manner, the encoding reference picture designation data showing picture number '7' is sent from the reference picture sending unit 61 to the sending side.

Next, the operation at the receiving side and the sending side when the picture with picture number '10' is encoded, and this encoded data is decoded is shown as STEP 2 in FIG. 10.

The operation of the sending side is as follows:

The reference picture receiving unit 41 receives the encoding reference picture designation data showing picture number '7' sent in the step wherein the receiving side decodes the encoded data with picture number '7', and the picture encoding unit 40 encodes the input picture with picture number '10' using the picture with picture number '7' as the reference picture. In this manner, the picture designation data notification unit 43 sends the picture designation data showing picture number '10', and the reference picture notification unit 42 sends the reference picture designation data showing the picture number '7' to the receiving side.

The operation at the receiving side is as follows:

When it is confirmed by the error detection unit 50 that there is no error in the data sent from the sending side, the picture designation data showing picture number '10' of the received encoded data is received in the receiving side multiplexing unit 51. In addition, when the reference picture designation data receiving unit 53 receives the reference picture designation data showing picture number '7', the reference picture change unit 56 will sent to the decoding unit 54 the picture with picture number '7' stored in the expected reference picture storage unit 59, and switch the switches. In this manner, the decoding unit 54 decodes the received encoded data with the picture number '10', making the picture with picture number '7' sent from the reference picture change unit 56 the reference picture.

In addition, the reference picture designation data that the reference picture designation data receiving unit 53 receives is also sent to the storage determination unit 57, and in the storage determination unit 57, the reference picture designation data showing the received picture number '7' and the data showing picture number '7' stored in the previous picture designation data storage unit 55 are compared. When it is determined by this comparison that they match, the storage change unit 58 updates the switches, and stores the decoded picture with picture number '10' in the expected reference picture storage unit 59.

In this manner, the picture with picture number '7' stored in the expected reference picture storage unit 59 is transferred to the present reference picture storage unit 60, and stored. At this time, the picture with picture number '5' stored in the present reference picture storage unit 60 is abandoned. In addition, because the storage determination unit 57 determines that the decoded picture is to be stored, the data showing picture number '10' received in the picture designation data receiving unit 52 is stored in the previous picture designation data storage unit 55. In this manner, the encoding reference picture designation data showing the picture number '10' stored in the previous picture designation data storage unit 55 is sent from the reference picture sending unit 61 to the sending side.

The operation of the sending side and the receiving side when encoding the picture with picture number '11', and the decoding of this encoded data is shown as STEP 3 in FIG. 10.

The operation of the sending side is as follows:

The reference picture receiving unit 41 receives the encoding reference picture designation data showing picture number '7' sent in the step wherein the receiving side decodes the encoded data with picture number '8', and the picture encoding unit 40 encodes the input picture with picture number '11' using the picture with picture number '7' as the reference picture. In this manner, the picture designation data notification unit 43 sends the picture designation data showing picture number '11' to the receiving side and the reference picture notification unit 42 sends the reference picture indication data showing the picture number '7'.

The operation at the receiving side is as follows:

When it is confirmed by the error detection unit 50 that there is no error in the data sent from the sending side, the picture designation data showing picture number '11' of the received encoded data is received. In addition, when the reference picture designation data receiving unit 53 receives the reference picture designation data showing picture number '7', the reference picture change unit 56 will sent to the decoding unit 54 the picture with picture number '7' stored in the expected reference picture storage unit 59, and switch the switches. In this manner, the decoding unit 54 decodes the received encoded data with picture number '11', making the picture with picture number '7' sent from the reference picture change unit 56 the reference picture.

In addition, the reference picture designation data that the reference picture designation data receiving unit 53 receives is also sent to the storage determination unit 57, and in the storage determination unit 57, the reference picture designation data showing the received picture number '7' and the data showing picture number '10' stored in the previous picture designation data storage unit 55 are compared. When it is determined by this comparison that they do not match, the expected reference picture storage unit 59 does not store the decoded picture with picture number '11' decoded by the decoding unit 54 in the expected reference picture storage unit 59.

In addition, in the previous picture designation data storage unit 55, the data showing '10' is stored as is, and in this manner the encoding reference picture designation data showing picture number '10' is sent from the reference picture sending unit 61 to the sending side.

Next, the operation of the sending side and the receiving side when the picture with picture number '12' is encoded and this encoded data is decoded is shown as STEP 4 in FIG. 10.

The operation at the sending side is as follows:

Because the delay time is equal to two pictures, the reference picture receiving unit 41 receives data showing picture number '7' sent when the picture with picture number '9' was decoded at the receiving side. In this manner, the picture encoding unit 40 encoded the input picture with picture number '12' using the picture with picture number '7' as the reference picture. In addition, the picture designation data notification unit 43 sends the picture designation data showing the picture number '12' to the receiving side, and the reference picture notification unit 42 sends the reference picture designation data showing picture number '7' to the receiving side.

The operation of the receiving side is as follows:

When it is confirmed by the error detection unit 50 that there is no error in the data sent from the sending side, the picture designation data showing picture number '12' of the received encoded data is received in the picture designation data receiving unit 52. In addition, when the reference picture designation data receiving unit 53 receives the reference picture designation data showing picture number '7', the reference picture change unit 56 will sent to the decoding unit 54 the picture with picture number '7' stored in the present reference picture storage unit 60, and switch the switches. In this manner, the decoding unit 54 decodes the received encoded data with the picture number '12', making the picture with picture number '7' sent from the reference picture change unit 56 the reference picture.

In addition, the reference picture designation data that the reference picture designation data receiving unit 53 receives is also sent to the storage determination unit 57, and in the storage determination unit 57, the reference picture designation data showing the received picture number '7' and the data showing picture number '10' stored in the previous picture designation data storage unit 55 are compared. When it is determined by this comparison that they do not match, the storage change unit 58 does not store the decoded picture with picture number '12' decoded by the decoding unit 54 in the expected reference picture storage unit 59.

In addition, the data showing picture number '10' in the previous picture designation data storage unit 55 is stored as is, and in this manner, the encoded reference picture designation data showing picture '10' is sent from the reference picture sending unit 61 to the sending side.

Next, the operation of the sending side and receiving side when the picture with picture number '13' is encoded and this encoded data is decoded is shown as STEP 5 in FIG. 10.

The operation of the sending side is as follows:

Because the delay time is equal to two pictures, the reference picture receiving unit 41 receives data showing picture number '10' sent when the picture with picture number '10' was decoded at the receiving side. In this manner, the picture encoding unit 40 encoded the input picture with picture number '13' using the picture with picture number '10' as the reference picture. In addition, the picture designation data notification unit 43 sends the picture designation data showing the picture number '13' to the receiving side, and the reference picture notification unit 42 sends the reference picture designation data showing picture number '10' to the receiving side.

The operation of the receiving side is as follows:

When it is confirmed by the error detection unit 50 that there is no error in the data sent from the sending side, the picture designation data showing picture number '13' of the received encoded data is received in the picture designation data receiving unit 52. In addition, when the reference picture designation data receiving unit 53 receives the reference picture designation data showing picture number '10', the reference picture change unit 56 will sent to the decoding unit 54 the picture with picture number '10' stored in the expected reference picture storage unit 59, and switch the switches. In this manner, the decoding unit 54 decodes the received encoded data with the picture number '13', making the picture with picture number '10' sent from the reference picture change unit 56 the reference picture.

In addition, the reference picture designation data that the reference picture designation data receiving unit 53 receives is also sent to the storage determination unit 57, and in the storage determination unit 57, the reference picture designation data showing the received picture number '10' and the data showing picture number '10' stored in the previous picture designation data storage unit 55 are compared. When it is determined by this comparison that they match, the storage change unit 58 switches are switches and stores the decoded picture with decoded picture with picture number '13' decoded by the decoding unit 54 in the expected reference picture storage unit 59.

In this manner, the picture with picture number '10' stored in the expected reference picture storage unit 59 is transferred to the present reference picture storage unit 60 and stored. At this time, the picture with picture number '7' stored in the present reference picture storage unit 60 is abandoned. In addition, because the storage determination unit 57 determines that the decoded picture is to be stored, in the previous picture designation data storage unit 55 the data showing picture number '13' received in the picture designation data receiving unit 52 is stored, In this manner, the encoding reference picture designation data showing the picture number '13' stored in the previous picture designation data storage unit 55 is sent to the sending side from the reference picture sending unit 61.

Next, the operation of the sending side and the receiving side when the picture with picture number '14' is encoded and this encoded data is decode is shown as STEP 6 in FIG. 10.

The operation of the sending side is as follows:

Because the delay time is equal to two pictures, the reference picture receiving unit 41 receives data showing picture number '10' sent when the picture with picture number '11' was decoded at the receiving side. In this manner, the picture encoding unit 40 encoded the input picture with picture number '14' using the picture with picture number '10' as the reference picture. In addition, the picture designation data notification unit 43 sends the picture designation data showing the picture number '14' tot he receiving side, and the reference picture notification unit 42 sends the reference picture designation data showing picture number '10' to the receiving side.

The operation of the receiving side is as follows:

When it is confirmed by the error detection unit 50 that there is no error in the data sent from the sending side, the picture designation data showing picture number '14' of the received encoded data is received in the picture designation data receiving unit 52. In addition, when the reference picture designation data receiving unit 53 receives the reference picture designation data showing picture number '10', the reference picture change unit 56 will sent to the decoding unit 54 the picture with picture number '10' stored in the present reference picture storage unit 60, and switch the switches. In this manner, the decoding unit 54 decodes the received encoded data with the picture number '14', making the picture with picture number '10' sent from the reference picture change unit 56 the reference picture.

In addition, the reference picture designation data that the reference picture designation data receiving unit 53 receives is also sent to the storage determination unit 57, and in the storage determination unit 57, the reference picture designation data showing the received picture number '10' and the data showing picture number '13' stored in the previous picture designation data storage unit 55 are compared. When it is determined by this comparison that they do not match, the storage change unit 58 does not store the decoded picture with picture number '14' decoded by the decoding unit 54 in the expected reference picture storage unit 59.

In addition, the data showing picture number '13' in the previous picture designation data storage unit 55 is stored as is, and in this manner, the encoded reference picture designation data showing picture '13' is sent from the reference picture sending unit 61 to the sending side.

As explained below, because at the receiving side, the reference picture used when encoding at the sending side is always stored in the expected reference picture storage unit 59 or the present reference picture storage unit 60, all of the encoded data sent from the sending side can be decoded.

[The Case in Which There is an Error in the Data Sent From the Sending Side Over the Transmission Line]

Figure 11:
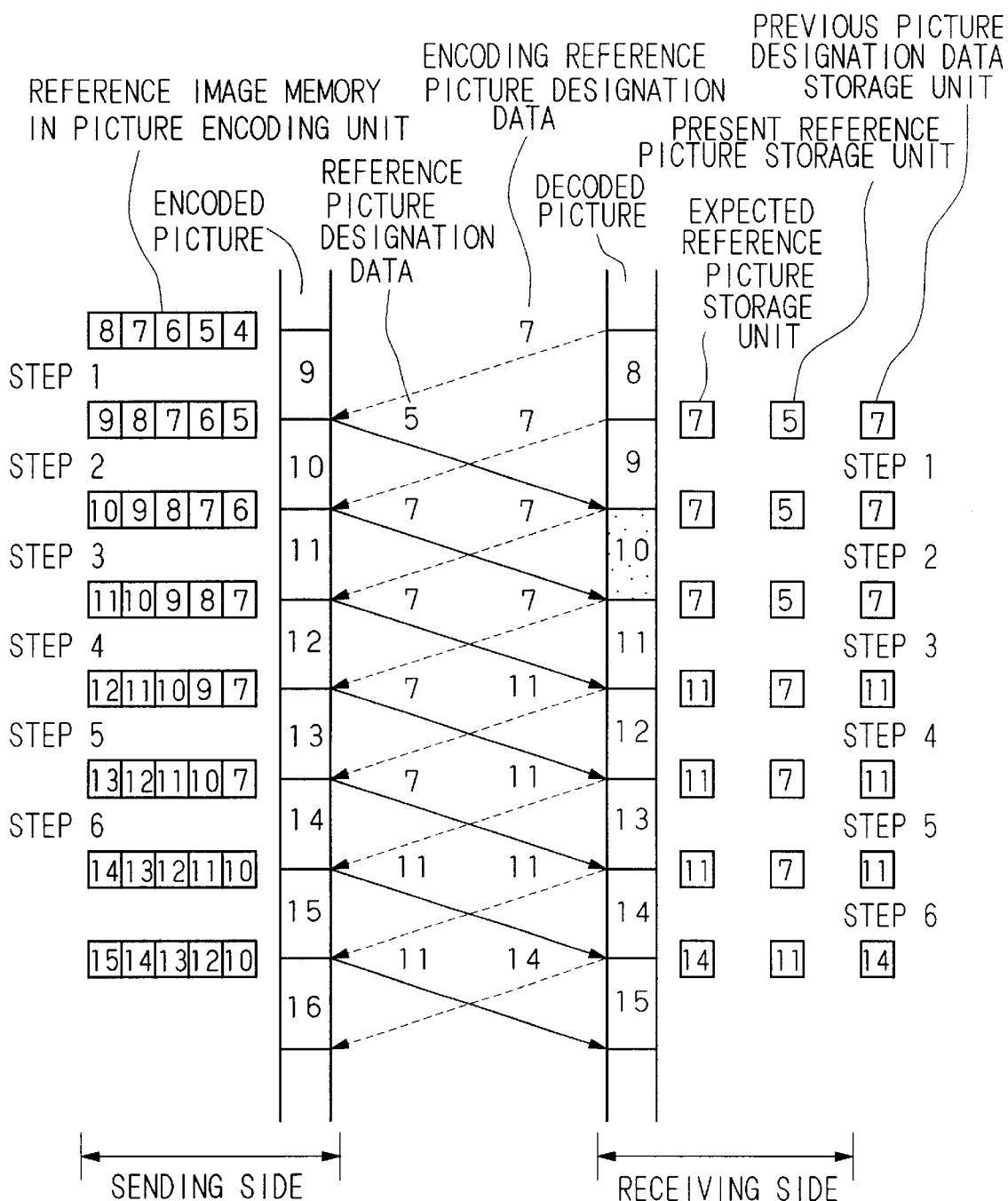
FIG. 11 shows an example of the operation when there is an error in the encoded data in the above video communication system.

FIG. 11 shows the operational flow of the sending side and the receiving side in the case that there is an error in the data sent from the sending side on the transmission line. In this figure, the numbers represent picture numbers. In addition, the numbers shown above the arrows representing the state of sending of encoded data from the sending side to the receiving side show reference picture designation data of the encoded data, which is to say, the picture number of the reference picture used when encoding.

Here, in the following explanation, we will assume the following conditions of communication as the initial state.

First, it is assumed that at the receiving side, the picture with picture number '5' in the present reference picture storage unit 60 is stored, and in the expected reference picture storage unit 59, the picture with picture '7' is stored in the expected reference picture storage unit 59. In addition, the picture number '7' of the picture stored in the expected reference picture storage unit 59 is stored. Additionally, because the reference picture sending unit 61 sends picture number stored in the previous picture designation data storage unit 55 to the sending side, under the initial conditions, the picture number '7' is sent to the sending side as the decoded reference picture designation data. In addition, at this time, at the sending side, encoding of the input picture is carried out using the picture with picture number '5' as the reference picture.

Under the above-described initial conditions, the process wherein the video communication system of the present embodiment encoded and decoded from picture number '9' to picture number '14' is explained. Moreover, in the following explanation, since it is assumed that because the there is an error in the encoded data of picture number '10' on the transmission line, the encoded data of the picture number '10' cannot be decoded.

First, the operation of the sending side and the receiving side when the picture with picture number '9' is encoded and this encoded picture is decoded are shown as STEP 1 in FIG. 11.

The operation of the sending side is as follows:

When the reference picture receiving unit 41 receives the encoded reference picture designation data sent from the receiving side, and the picture number '5' shown by the encoded reference picture designation data is designated the reference picture to be used when encoding, the picture encoding unit 40 encodes the input picture with picture number '9' using the picture number '5' as the reference picture. In this manner, the picture designation data notification unit 43 sends picture reference data showing picture number '9', and the reference picture notification unit 42 sends reference picture designation data showing picture number '5'.

The operation of the receiving side is as follows:

When it has been confirmed by the error detection unit 50 that there has been no error in the data sent from the sending side, in the picture designation data receiving unit 52, the picture designation data showing the picture number '9' of the received encoded data. In addition, when the reference picture designation data receiving unit 53 receives the reference picture designation data showing picture number '5', the reference picture change unit 56 will sent the picture with picture number '5' stored in the present reference picture storage unit 60 as the reference picture to the decoding unit 54, and switches the switch. In this manner, the decoding unit 54 makes the picture with picture number '5' sent from the reference picture change unit 56 the reference picture, and decodes the encoded data of the received picture number '9'.

In addition, the reference picture designation data that the reference picture designation data receiving unit 53 receives is also sent to the storage determination unit 57, and in the storage determination unit 57, the reference picture designation data showing the received picture '5' and the data showing picture number '7' stored in the previous picture designation data storage unit 55 are compared. When it is determined by this comparison that they do not match, the storage change unit 58 does not store the decoded picture with the picture number '9' decoded by the decoding unit 54 in the expected reference picture storage unit 59.

In addition, in the previous picture designation data storage unit 55, the data showing the picture number '7' received by the picture designation data receiving unit 52 is stored as is, and in this manner, the encoding reference picture designation data showing picture number '7' is sent from the reference picture sending unit 61 to the sending side.

Next, the operation at the receiving side and the sending side when the picture with picture number '10' is encoded, and this encoded data is decoded is shown as STEP 2 in FIG. 11.

The operation of the sending side is as follows:

The reference picture receiving unit 41 receives the encoding reference picture designation data showing picture number '7' sent in the step wherein the receiving side decodes the encoded data with picture number '7', and the picture encoding unit 40 encodes the input picture with picture number '10' using the picture with picture number '5' as the reference picture. In this manner, the picture designation data notification unit 43 sends the picture designation data showing picture number '10', and the reference picture notification unit 42 sends the reference picture designation data showing the picture number '7'.

The operation at the receiving side is as follows:

When an error has been detected in the data sent from the sending side by the error detection unit 50, this data is abandoned. Due to this, decoding cannot be carried out in the decoding unit 54. In addition, in the storage change unit 58, switching of the switches is not carried out. Furthermore, picture number '7' is stores as is in the previous picture designation data storage unit 55. Thus, the reference picture sending unit 61 sends the picture number '7' stored in the previous picture designation data storage unit 55 to the sending side as the encoding reference picture designation data.

The operation of the sending side and the receiving side when encoding the picture with picture number '11', and the decoding of this encoded data is shown as STEP 3 in FIG. 11.

The operation of the sending side is as follows:

The reference picture receiving unit 41 receives the encoding reference picture designation data showing picture '7' sent in the step wherein the receiving side decodes the encoded data with picture number '8', and the picture encoding unit 40 encodes the input picture with picture number '11' using the picture with picture number '7' as the reference picture. In this manner, the picture designation data notification unit 43 sends the picture designation data showing picture number '11' and the reference picture notification unit 42 sends the reference picture indication data showing the picture number '7'.

The operation at the receiving side is as follows:

When it is confirmed by the error detection unit 50 that there is no error in the data sent from the sending side, the picture designation data showing picture number '11' of the received encoded data is received. In addition, when the reference picture designation data receiving unit 53 receives the reference picture designation data showing picture number '7', the reference picture change unit 56 will sent to the decoding unit 54 the picture with picture number '7' stored in the expected reference picture storage unit 59, and switch the switches. In this manner, the decoding unit 54 decodes the received encoded data with picture number '11', making the picture with picture number '7' sent from the reference picture change unit 56 the reference picture.

In addition, the reference picture designation data that the reference picture designation data receiving unit 53 receives is also sent to the storage determination unit 57, and in the storage determination unit 57, the reference picture designation data showing the received picture number '7' and the data showing picture number '7' stored in the previous picture designation data storage unit 55 are compared. When it is determined by this comparison that they match, the storage change unit 58 changes the switch and stores the decoded picture with picture number '10' in the expected reference picture storage unit 59.

In this manner, the picture with picture number '7' stored in the expected reference picture storage unit 59 is transferred to the present reference picture storage unit 60, and stored. At this time, the picture with picture number '5' is stored in the present reference picture storage unit 60, and the picture with picture number '5' is abandoned. In addition, because the storage determination unit 57 determines that the decoded picture is to be stored, in the previous picture designation data storage unit 55, the data showing picture number '11' received in the picture designation data receiving unit 52 is stored. In this manner, the decoded reference picture designation data showing picture number '11' stored the previous picture designation data storage unit 55 is sent to the sending side from the reference picture sending unit 61.

Next, the operation of the sending side and the receiving side when the picture with picture number '12' is encoded and this encoded data is decoded is shown as STEP 4 in FIG. 11.

The operation at the sending side is as follows:

Because the delay time is equal to two pictures, the reference picture receiving unit 41 receives data showing picture number '7' sent when the picture with picture number '9' was decoded at the receiving side. In this manner, the picture encoding unit 40 encodes the input picture with picture '12' using the picture with picture number '7' as the reference picture. In addition, the reference picture notification unit 42 sends the picture designation data showing the picture number '12', and the picture designation data notification unit 43 sends the reference picture designation data showing picture number '7' to the receiving side.

The operation of the receiving side is as follows:

When it is confirmed by the error detection unit 50 that there is no error in the data sent from the sending side, the picture designation data showing picture number '12' of the received encoded data is received in the picture designation data receiving unit 52. In addition, when the reference picture designation data receiving unit 53 receives the reference picture designation data showing picture number '7', the reference picture change unit 56 will sent to the decoding unit 54 the picture with picture number '7' stored in the present reference picture storage unit 60, and switch the switches. In this manner, the decoding unit 54 decodes the received encoded data with the picture number '12', making the picture with picture number '7' sent from the reference picture change unit 56 the reference picture.

In addition, the reference picture designation data that the reference picture designation data receiving unit 53 receives is also sent to the storage determination unit 57, and in the storage determination unit 57, the reference picture designation data showing the received picture number '7' and the data showing picture number '11' stored in the previous picture designation data storage unit 55 are compared. When it is determined by this comparison that they do not match, the storage change unit 58 does not store the decoded picture with picture number '12' decoded by the decoding unit 54 in the expected reference picture storage unit 59.

In addition, the data showing picture number '11' in the previous picture designation data storage unit 55 is stored as is, and in this manner, the encoded reference picture designation data showing picture '11' is sent from the reference picture sending unit 61 to the sending side.

Next, the operation of the sending side and receiving side when the picture with picture number '13' is encoded and this encoded data is decoded is shown as STEP 5 in FIG. 11.

The operation of the sending side is as follows:

Because the delay time is equal to two pictures, the reference picture receiving unit 41 receives data showing picture number '7' sent when the picture with picture number '10' was decoded at the receiving side. In this manner, the picture encoding unit 40 encoded the input picture with picture number '13' using the picture with picture number '7' as the reference picture. In addition, the picture designation data notification unit 43 sends the picture designation data showing the picture '13', and the reference picture notification unit 42 sends the reference picture designation data showing picture number '7' to the receiving side.

The operation of the receiving side is as follows:

When it is confirmed by the error detection unit 50 that there is no error in the data sent from the sending side, the picture designation data showing picture number '13' of the received encoded data is received in the picture designation data receiving unit 52. In addition, when the reference picture designation data receiving unit 53 receives the reference picture designation data showing picture '7', the reference picture change unit 56 will sent to the decoding unit 54 the picture with picture number '7' stored in the expected reference picture storage unit 59, and switch the switches. In this manner, the decoding unit 54 decodes the received encoded data with the picture number '13', making the picture with picture number '7' sent from the reference picture change unit 56 the reference picture.

In addition, the reference picture designation data that the reference picture designation data receiving unit 53 receives is also sent to the storage determination unit 57, and in the storage determination unit 57, the reference picture designation data showing the received picture number '7' and the data showing picture number '11' stored in the previous picture designation data storage unit 55 are compared. When it is determined by this comparison that they do not match, the storage change unit 58 does not store the decoded picture with the picture number '13' decoded by the decoding unit 54 in the expected reference picture storage unit 59.

In addition, in the previous picture designation data storage unit 55, the data showing picture number '11' is stored as is, and in this manner the encoded reference picture designation data showing the picture number '11' is sent to the sending side.

Next, the operation of the sending side and the receiving side when the picture with picture number '14' is encoded and this encoded data is decode is shown as STEP 6 in FIG. 11.

Because the delay time is equal to two pictures, the reference picture receiving unit 41 receives data showing picture number '11' sent when the picture with picture number '11' was decoded at the receiving side. In this manner, the picture encoding unit 40 encoded the input picture with picture number '14' using the picture with picture number '11' as the reference picture. In addition, the picture designation data notification unit 43 sends the picture designation data showing the picture number '14', and the reference picture notification unit 42 sends the reference picture designation data showing picture number '11' to the receiving side.

The operation of the receiving side is as follows:

When it is confirmed by the error detection unit 50 that there is no error in the data sent from the sending side, the picture designation data showing picture number '14' of the received encoded data is received in the picture designation data receiving unit 52. In addition, when the reference picture designation data receiving unit 53 receives the reference picture designation data showing picture number '11', the reference picture change unit 56 will sent to the decoding unit 54 the picture with picture number '11' stored in the present reference picture storage unit 60, and switch the switches. In this manner, the decoding unit 54 decodes the received encoded data with the picture number '14', making the picture with picture number '11' sent from the reference picture change unit 56 the reference picture.

In addition, the reference picture designation data that the reference picture designation data receiving unit 53 receives is also sent to the storage determination unit 57, and in the storage determination unit 57, the reference picture designation data showing the received picture '11' and the data showing picture number '11' stored in the previous picture designation data storage unit 55 are compared. When it is determined by this comparison that they match, the storage change unit 58 switches the switches, and stores the decoded picture with picture number '14' is the expected reference picture storage unit 59.

In this manner, the picture with picture number '11' stored in the expected reference picture storage unit 59 is transferred to the present reference picture storage unit 60, and stored. At this time, the picture with picture number '7' stored in the present reference picture storage unit 60 is abandoned. In addition, because the storage determination unit 57 determines that the decoded picture is to be stored, in the previous picture designation data storage unit 55, the data showing picture number '14' received in the picture designation data receiving unit 52 is stored, In this manner, the encoded reference picture designation data showing the picture number '14' stored in the previous picture designation data storage unit 55 is sent from the reference picture sending unit 61 to the sending side.

As shown above, because the reference picture used when decoding at the receiving side is always stored in the expected reference picture storage unit 59 or the present reference picture storage unit 60, even when there is an error in a given signal on the transmission line 1, if there is no error in the next signal, this picture can be decoded.

In the present embodiment, at the receiving side, until the encoded data encoded using the picture which the storage determination unit 57 has determined to be stored is received by the receiving side, this determined picture is maintained in the expected reference picture storage unit 59, and thus if there is no error in the received encoded data on the transmission line, the picture corresponding to the reference picture designation data sent from the sending side is made the reference picture, and this sent encoded data can always be decoded.

Fourth Embodiment

Next, a video communication system in which the receiving side can adjust from its point of view the reduction of error propagation and the decreasing the lowering of encoding efficiency, and in which the reference picture memory at the receiving side can be decreased, by using a combination of the video communication system shown in the above-described first embodiment and the video communication system shown in the third embodiment will be explained.

FIG. 14 is a block diagram showing the structure of the video communication system according to the present embodiment. In this figure, components which are the same as those in FIG. 1 have the same reference number, and their detailed explanation is omitted. The point on which the video communication system shown in FIG. 14 differs from that in FIG. 1 is that the following structure has been added to the receiving side.

At the receiving side shown in FIG. 14, the present reference picture storage determination unit 70 determines whether or not to store the picture which the expected reference picture storage unit 72 has stored in the present reference picture storage unit 71 based on the picture number showing the reference picture designation data received by the reference picture designation data receiving unit 22 and the picture number stored in the decoded picture designation data storage unit 28. That is, when the picture number showing the reference picture designation data that the reference picture designation data receiving unit 22 has received matches the picture number stored in the decoded picture designation data storage unit 28, it is determined that the picture that the expected reference picture storage unit 72 stores in the present reference picture storage unit 71 will be stored, and when they do not match, determines that it will not be stored.

In addition, when the reference picture storage switching unit 73 determines that the picture which the present reference picture storage determination unit 70 has stored in the expected reference picture storage unit 72 is to be stored in the present reference picture storage unit 71, the switching state is switched to the present reference picture storage unit 71, and the picture stored in the expected reference picture storage unit 72 is stored in the present reference picture storage unit 71.

The storage determination unit 74 determines whether or not to store the decoded picture which has been decoded by the decoding unit 20 in the expected reference picture storage unit 72 according to the following two conditions:

(1) When the reference picture designation method control unit 25 instructs the sending side to carry out encoding using the previous picture as the reference picture, it determines that the decoded picture sent from the decoding unit 20 is always stored.

(2) When the reference picture designation method control unit 25 instructs the sending side to carry out encoding using the specified reference picture the receiving side designates, if the picture number shown by the reference picture designation data received by the reference picture designation data receiving unit 22 and the picture number stored in the decoded picture designation data storage unit 28 match, then it determines that the decoded picture sent from the decoding unit 20 will be stored.

The storage switching unit 75 stores the decoded picture which the decoding unit 20 decoded in the expected reference picture storage unit 72 depending on the determination of the storage determination unit 74.

Moreover, in the encoded reference picture memory 3 at the sending side, the picture decoded in the picture designation data notification unit 9 is stored and the old picture is deleted, but the picture used in the reference picture is always stored.

In addition, at the receiving side, the reference picture designation method control unit 25 switches the reference picture to the specified picture if an error is detected in the encoded data when the latest previously encoded picture is designated to be used as the reference picture when carrying out encoding. In contrast, if there are no errors detected in the encoded data in two consecutive frames when instructed to use the specified picture as the reference picture, it alters the instruction so that the latest previously encoded picture is used as the reference picture when encoding is carried out.

Next, the operation of the video communication system having the above-described structure is explained. Moreover, the following is a description of the delay time of the data transferred between the sending side and the receiving side used below in explaining the operation of the above video communication system.

That is, suppose a one picture delay is produced until the encoded data sent from the sending side arrives at the receiving side, and in addition, a one picture delay is produced by the time the continuous reference picture designation data and the specified reference picture designation data sent from the receiving side arrive at the sending side. Due to this, a two picture delay is produced from the time the sending side sends the encoded data until the receiving side decodes this encoded data, and as result of this decoding, the continuous reference picture designation data and the specified reference picture designation data sent to the sending side are received at the sending side.

In addition, assume following state on the transmission line to be the initial conditions of the sending side and the receiving side. First, from picture number '1' to picture number '6', encoding and decoding have been carried out using the previous picture as the reference picture. That is, when picture number '6' is encoded, at the sending side, the pictures from picture number '1' to picture number '5' are stored in the encoded reference picture memory 3, and the picture with picture number '6' is encoded using the picture with picture number '5' as the reference picture, and in this manner, in the encoded picture designation data storage unit 6, the picture number '5' is stored.

In contrast, suppose at the receiving side, the picture with picture number '4' is stored in the present reference picture storage unit 71, and the picture with picture number '5' is stored in the expected reference picture storage unit 72. In addition, suppose that in the decoded picture designation data storage unit 28, the picture number '5' is stored. Furthermore, up to the picture number '5', the continuous reference picture designation data showing '1' and the specified reference picture designation data showing '0' are respectively sent from the receiving side to the sending side.

In the following, the operation of the receiving side and the sending side will be explained referring to FIG. 15 in the case there is an error in the data sent from the sending side on the transmission line. Moreover, FIG. 15 shows the case when the data including the encoded data of the pictures with picture numbers '6', '8', and '10' is sent to the receiving side. In addition, the numbers shown in this figure show the picture number, and the numbers shown above the arrows showing the state of the encoded data sent from the sending side to the receiving side show the reference picture designation data of this encoded data, that is to say, the picture number of the reference picture used when encoding.

First, the operation of the sending side and receiving side when the picture with picture number '6' is encoded and this encoded data is decoded as STEP 1 in FIG. 15.

The operation of the sending side is as follows:

When the continuous reference picture designation data receiving unit 7 receives the continuous reference picture designation data showing '1', the encoded reference picture selecting unit 4 selects the picture with picture number '5' stored in the encoded picture designation data storage unit 6 from the encoded reference picture memory 3. In this manner, the encoding unit 1 encodes the input picture with picture number '6' using the picture with picture number '5' selected by the encoded reference picture selecting unit 4 as the reference picture.

In addition, local decoding unit 2 decodes the above encoded data using the picture with picture number '5' as the reference picture, and stores this decoded picture in the encoded reference picture memory 3. In addition, the picture designation data notification unit 9 sends data showing picture number '6' of the encoded data to the receiving side, and at this time, the data showing picture number '6' is stored in the encoded picture designation data storage unit 6. In addition, the reference picture notification unit 5 sends data showing picture number '5' of the reference picture used on encoding to the receiving side.

The operation of the receiving side is as follows:

In the error detection unit 30, when it is confirmed that an error has been detected in the data sent from the sending side, this data is abandoned. Because of this, in the decoding unit 20 decoding is not carried out. At this time, because an error has been detected in the data sent from the sending side, the reference picture designation method control unit 25 designates the picture designated by the picture designation data stored in the decoded picture designation data storage unit 28 as the reference picture to be used in decoding.

In this manner, the decoded reference pictire designation method selecting unit 26 switches switch S1 to memory M1 side, and at the same time, the switch S2 is switched to the decoded picture designation data storage unit 28 side. In addition, by the above switching, the specified reference designation data showing picture number '5' stored the decoded picture designation data storage unit 28 is sent from the specified reference picture designation data sending unit 29 to the sending side. In addition, the continuous reference picture designation data showing '0' is sent to the sending side from the continuous reference picture designation data sending unit 27.

Next, the operation of the sending side and receiving side when the picture with picture number '7' is encoded and this encoded data is decoded is shown in FIG. 15 as STEP 2.

The operation at the sending side is as follows:

When the continuous reference picture designation data receiving unit 7 receives the continuous reference picture designation data showing picture number '1' sent when the encoded data of reference number '4' was decoded at the receiving side, the encoded reference picture selecting unit 4 selects the picture with picture number '6' stored in the encoded picture designation data storage unit 6 from the encoded reference picture memory 3. In this manner, the encoding unit 1 encodes the sent picture with the picture number '7' using the picture with picture number '6' selected by the encoded reference picture selecting unit 4 as the reference picture.

Additionally, the local decoding unit 2 decodes the above encoded data using the picture with picture number '6' as the reference picture, and stores this decoded picture in the encoded reference picture memory 3. In addition, the picture designation data notification unit 9 sends data showing picture number '7' of the encoded data to the receiving side, and at this time, the data showing the picture number '7' is stored in the encoded picture designation data storage unit 6. In addition, the reference picture notification unit 5 sends the data showing picture number '6' of the reference picture used when decoding to the receiving side.

When it is confirmed that no error has been detected in the data sent from the sending side in the error detection unit 30, the picture designation data receiving unit 21 receives the picture number '7' of the received encoded data. In addition, the reference picture designation data receiving unit 22 receives the reference picture designation data showing picture number '6', but because the picture with picture number '6' is not stored in either the present reference picture storage unit 71 or the expected reference picture storage unit 72, the decoded reference picture selecting unit 23 cannot select a reference picture. Due to this, the decoding unit 20 cannot correctly decode the received encoded data because there is no reference data.

At this time, in order to instruct the sending side to make the picture correctly decoded at the receiving side the reference picture to be used when decoding, the reference picture designation method control unit 25 designates the picture designated by the picture designation data stored in the decoded picture designation data storage unit 28 as the reference picture to be used when encoding. In this manner, because the decoded reference picture designation method selecting unit 26 maintains the switching state of switch S1 and switch S2, from the specified reference picture designation data sending unit 29 the specified reference picture designation data showing picture number '5' stored in the decoded picture designation data storage unit 28 is sent to the sending side, and from the continuous reference picture designation data sending unit 27 the continuous reference picture designation data showing '0' is sent to the receiving side.

Next, the operation of the sending side and the receiving side when encoding the picture with picture number '8' is encoded and this encoded data is decoded is shown as STEP 3 in FIG. 15.

The operation of the sending side is as follows:

When the continuous reference picture designation data receiving unit 7 receives the continuous reference picture designation data showing picture number '1' sent when the encoded data of picture number '5' at the receiving side is decoded, the encoded reference picture selecting unit 4 selects from the encoded reference picture memory 3 the picture with picture number '7' stored in the encoded picture designation data storage unit 6. In this manner, the encoding unit 1 encodes the input picture with picture number '8' using the picture with picture number '7' selected by the encoded reference picture selecting unit 4 as the reference picture.

In addition, the local decoding unit 2 decodes the above encoded data using the picture with picture number '7' as the reference picture, and stores this decoded picture in the encoded reference picture memory 3. Additionally, the picture designation data notification unit 9 sends the data showing picture number '8' of the encoded data to the receiving side, and at this time, stores the data showing picture number '8' in the encoded picture designation data storage unit 6. In addition, the reference picture notification unit 5 sends the data showing the picture number '7' of the reference picture used in the encoding to the receiving side.

The operation of the receiving side is as follows:

When it is confirmed in the error detection unit 30 that errors have been detected in the data sent from the sending side, this data is abandoned, and thus decoding cannot be carries out in the decoding unit 20. In addition, because the data sent from the sending side has errors, the reference picture designation method control unit 25 designates the picture designated by the picture designation data stored in the decoded picture designation data storage unit 28 as the reference picture to be used when decoding.

In this manner, because the decoded reference picture designation method selecting unit 26 maintains the switching state of switch S1 and switch S2, specified reference picture designation data showing the picture number '5' stored in the decoded picture designation data storage unit 28 is sent to the sending side from the specified reference picture designation data sending unit 29, and additionally, the continuous reference picture designation data showing '0' is sent to the sending side from the continuous reference picture designation data sending unit 27.

Next, the operation of the sending side and the receiving side when the picture with picture number '9' is encoded and this encoded data is decoded is shown in STEP 4 in FIG. 15.

The operation of the sending side is as follows:

When the specified reference picture designation data receiving unit 8 receives the specified reference picture designation data of picture number '5' sent when the encoded data of picture number '6' was decoded at the sending side, the encoded reference picture selecting unit 4 selects the picture with picture number '5' showing the above specified reference picture designation data from the encoded reference picture memory 3. In this manner, the encoding unit 1 encodes the input picture with picture number '9' using the picture with picture number '5' selected by the encoded reference picture selecting unit 4 as the reference picture.

In addition, the local decoding unit 2 decodes the above encoded data using the picture with picture number '5' as the reference picture, and this decoded picture is stored in the encoded reference picture memory 3. Additionally, the picture designation data notification unit 9 sends the data showing picture number '9' of the encoded data to the receiving side, and at this time, the data showing picture number '9' is stored in the encoded picture designation data storage unit 6. In addition, the reference picture notification unit 5 sends the data showing the picture number '5' of the reference number used in encoding to the receiving side.

The operation of the receiving side is as follows:

When it is confirmed in the error detection unit 30 that no error has been detected in the data sent from the sending side, the picture designation data receiving unit 21 receives the picture number '9' of the received encoded data. In addition, when the reference picture designation data receiving unit 22 receives the reference picture designation data showing the picture number '5', the decoded reference picture selecting unit 23 selects the picture with picture number '5' stored in the continuous reference picture designation data sending unit 27 as the reference picture, and inputs this to the decoding unit 20.

In this manner, the decoding unit 20 decoded the received encoded data using the picture with picture number '5' as the reference picture, and inputs the correctly decoded picture (picture number '9') to the storage switching unit 75. Additionally, the reference picture designation method control unit 25 instructs the sending side to carry out encoding using the specified picture that the receiving side designates as the reference picture.

Here, the storage determination unit 74 determines that the picture with picture number '9' that the decoding unit 20 has decoded will be stored in the expected reference picture storage unit 72, because the reference picture designation method control unit 25 has instructed that encoding be carried out using a specified picture as the reference picture, and the picture number '5' indicated by the reference picture designation data the reference picture designation data receiving unit 22 received and the picture number '5' stored in the decoded picture designation data storage unit 28 match. In this manner, the storage switching unit 75 switches the switching state to the expected reference picture storage unit 72, and the decoded picture with picture number '9' sent from the decoding unit 20 is stored in the expected reference picture storage unit 72.

In addition, because the picture number '5' indicated by the reference picture designation data the reference picture designation data receiving unit 22 received and the picture number '5' stored in the decoded picture designation data storage unit 28 match, the present reference picture storage determination unit 70 determines that the picture with picture number '5' stored in the expected reference picture storage unit 72 will be stored in the present reference picture storage unit 71. In this manner, the reference picture storage switching unit 73 switches the switching state to the expected reference picture storage unit 72, and stores the picture stored in the expected reference picture storage unit 72 in the present reference picture storage unit 71.

Furthermore, because the storage determination unit 74 determines that the decoded picture will be stored, the data showing picture number '9' received by the picture designation data receiving unit 21 is stored in the decoded picture designation data storage unit 28. Additionally, because the reference picture designation method control unit 25 has instructed that decoding be carried out using a specified picture as the reference picture, the decoded reference picture designation method selecting unit 26 maintains the switching state of switch S1 and switch S2. In this manner, the picture number '9' stored in the decoded picture designation data storage unit 28 is sent from the specified reference picture designation data sending unit 29 to the sending side as the specified reference picture designation data, and the continuous reference picture designation data showing '0' is sent from the continuous reference picture designation data sending unit 27 to the sending side.

Next, the operation of the sending side and the receiving side when the picture with picture number '10' is encoded and this encoded data is decoded is shown as STEP 5 in FIG. 15.

The operation at the sending side is as follows:

When the specified reference picture designation data receiving unit 8 receives the specified reference picture designation data of picture number '5' sent when the encoded data of picture number '7' was decoded at the sending side, the encoded reference picture selecting unit 4 selects the picture with picture number '5' showing the above specified reference picture designation data from the encoded reference picture memory 3. In this manner, the encoding unit 1 encodes the input picture with picture number '10' using the picture with picture number '5' selected by the encoded reference picture selecting unit 4 as the reference picture.

In addition, the local decoding unit 2 decodes the above encoded data using the picture with picture number '5' as the reference picture, and this decoded picture is stored in the encoded reference picture memory 3. Additionally, the picture designation data notification unit 9 sends the data showing picture number '10' of the encoded data to the receiving side, and at this time, the data showing picture number '10' is stored in the encoded picture designation data storage unit 6. In addition, the reference picture notification unit 5 sends the data showing the picture number '5' of the reference number used in encoding to the receiving side.

The operation at the receiving side is as follows:

In the error detection unit 30, when it is confirmed that an error has been detected in the data sent from the sending side, this data is abandoned. Because of this, in the decoding unit 20 decoding is not carried out. In addition, because an error has been detected in the data sent from the sending side, the reference picture designation method control unit 25 instructs that the picture designated by the picture designation data stored in the decoded picture designation data storage unit 28 as the reference picture to be used in decoding.

In this manner, because the decoded reference picture designation method selecting unit 26 maintains the switching state of the switch S1 and the switch S2, the specified reference picture designation data sending unit 29 sends to the sending side the specified reference picture designation data showing picture number '9' stored in the decoded picture designation data storage unit 28, and additionally, the continuous reference picture designation data sending unit 27 sends to the sending side the continuous reference picture designation data showing '0'.

Next, the operation of the sending side and the receiving side when the picture with picture number '11' is encoded ant his encoded picture is decoded is shown as STEP 6 is FIG. 15.

The operation of the sending side is as follows:

When the specified reference picture designation data receiving unit 8 receives the specified reference picture designation data of picture number '5' sent when the decoding of the encoded data of picture number '8' was attempted at the sending side, the encoded reference picture selecting unit 4 selects the picture with picture number '5' showing the above specified reference picture designation data from the encoded reference picture memory 3. In this manner, the encoding unit 1 encodes the input picture with picture number '11' using the picture with picture number '5' selected by the encoded reference picture selecting unit 4 as the reference picture.

In addition, the local decoding unit 2 decodes the above encoded data using the picture with picture number '5' as the reference picture, and this decoded picture is stored in the encoded reference picture memory 3. Additionally, the picture designation data notification unit 9 sends the data showing picture number '11' of the encoded data to the receiving side, and at this time, the data showing picture number '11' is stored in the encoded picture designation data storage unit 6. In addition, the reference picture notification unit 5 sends the data showing the picture number '5' of the reference number used in encoding to the receiving side.

The operation of the receiving side is as follows:

When it is confirmed in the error detection unit 30 that no error has been detected in the data sent from the sending side, in the picture designation data receiving unit 21, the picture number '11' of the received encoded data is received, and the data showing this picture number '11' is stored in the decoded picture designation data storage unit 28. In addition, when the reference picture designation data receiving unit 22 receives the reference picture designation data specifying the picture number '5', the decoded reference picture selecting unit 23 selects the picture with picture '5' is selected as the reference picture, and sent to the decoding unit 20.

Thereby, the decoding unit 20 decodes the received encoded data using the picture with picture number '5' as the reference picture, and sends the correctly decoded picture (picture number '11') to the storage switching unit 75. Additionally, the reference picture designation method control unit 25 instructs the sending side to carry out encoding using the specified picture designated by the receiving side as the reference picture.

Here, the storage determination unit 74 determines that the decoded picture with picture number '11' that the decoding unit 20 decoded will not be stored in the expected reference picture storage unit 72 because the picture number '5' specified by the reference picture designation data the reference picture designation data receiving unit 22 received and wherein the reference picture designation method control unit 25 has designated a specified picture as the reference picture, and the picture number '9' stored in the decoded picture designation data storage unit 28 do not match. In this manner, the storage switching unit 75 switches the switching state to the open side, and does not store in the expected reference picture storage unit 72 the decoded picture with picture number '11' sent from the decoding unit 20.

In addition, because the storage determination unit 74 has determined not to store the decoded picture, the picture number '11' received from the picture designation data receiving unit 21 is not stored in the decoded picture designation data storage unit 28. Additionally, because the reference picture designation method control unit 25 instructed that encoding be carried out using a specified picture as the reference picture, the decoded reference picture designation method selecting unit 26 maintains the switching state of the switch S1 and the switch S2. In this manner, the picture number '9' stored in the decoded picture designation data storage unit 28 from the specified reference picture designation data sending unit 29 is sent to the sending side as specified reference picture designation data, and continuous reference picture designation data showing '0' is sent to the sending side.

Next, the operation at the sending side and the receiving side while the picture with picture number '12' is encoded and this encoded picture is decoded is shown as STEP 7 in FIG. 15.

The operation of the sending side is as follows:

When the specified reference picture designation data receiving unit 8 receives the specified reference picture designation data of picture number '9' sent when the decoding of the encoded data of picture number '9' was attempted at the sending side, the encoded reference picture selecting unit 4 selects the picture with picture number '5' showing the above specified reference picture designation data from the encoded reference picture memory 3. In this manner, the encoding unit lencodes the input picture with picture number '12' using the picture with picture number '9' selected by the encoded reference picture selecting unit 4 as the reference picture.

In addition, the local decoding unit 2 decodes the above encoded data using the picture with picture number '9' as the reference picture, and this decoded picture is stored in the encoded reference picture memory 3. Additionally, the picture designation data notification unit 9 sends the data showing picture number '12' of the encoded data to the receiving side, and at this time, the data showing picture number '12' is stored in the encoded picture designation data storage unit 6. In addition, the reference picture notification unit 5 sends the data showing the picture number '9' of the reference number used in encoding to the receiving side.

The operation of the receiving side is as follows:

When it is confirmed in the error detection unit 30 that no error has been detected in the data sent from the sending side, in the picture designation data receiving unit 21, the picture number '12' of the received encoded data is received. In addition, when the reference picture designation data receiving unit 22 receives the reference picture designation data specifying the picture number '9', the decoded reference picture selecting unit 23 selects the picture with picture number '9' is selected as the reference picture, and sent to the decoding unit 20.

In this manner, the decoding unit 20 decodes the encoded picture received using the picture with picture number '9' used as the reference picture, and the correctly decoded picture (picture number '12') is sent to the storage switching unit 75. Additionally, because no communication errors have been detected in two consecutive frames, the reference picture designation method control unit 25 directs the sending side to carry out encoding using the latest previously encoded picture as the reference picture. In this manner, the decoded reference picture designation method selecting unit 26 switches the switch S1 to the memory M2 side, and sends to the sending side the continuous reference picture designation data showing '1' from the continuous reference picture designation data sending unit 27, and additionally, sends to the sending side the specified reference picture designation data showing '0' from the specified reference picture designation data sending unit 29.

In addition, because the reference picture designation method control unit 25 designates the latest previously encoded picture as the reference picture, the storage determination unit 74 determines that the decoded picture with picture number '12' be stored in the expected reference picture storage unit 72. In this manner, the storage switching unit 75 switches the switching state to the expected reference picture storage unit 72 side, and stores in the expected reference picture storage unit 72 the decoded picture with picture number '12' sent from the decoding unit 20.

In addition, the present reference picture storage determination unit 70 determines that the picture with picture number '9' stored in the expected reference picture storage unit 72 will be stored in the present reference picture storage unit 71 because the picture number '9' specified by the reference picture designation data that the reference picture designation data receiving unit 22 receives and the picture number '9' stored in the expected reference picture storage unit 72 match. In this manner, the reference picture storage switching unit 73 switches the switching state to the present reference picture storage unit 71 side, and stores the picture stored in the expected reference picture storage unit 72 in the present reference picture storage unit 71.

Furthermore, because the storage determination unit 74 determines that the decoded picture with picture number '12' sent from the decoding unit 20, the data with picture number '12' that the picture designation data receiving unit 21 receives is stored in the decoded picture designation data storage unit 28.

Next, the operation of the sending side and the receiving side when the picture with picture number '13' is encoded and this encoded data is decoded is shown as STEP 8 in FIG. 15.

The operation of the sending side is as follows:

When the specified reference picture designation data receiving unit 8 receives the specified reference picture designation data of picture number '9' sent when the decoding of the encoded data of picture number '10' was attempted at the sending side, the encoded reference picture selecting unit 4 selects the picture with picture number '9' showing the above specified reference picture designation data from the encoded reference picture memory 3. In this manner, the encoding unit 1 encodes the input picture with picture number '13' using the picture with picture number '9' selected by the encoded reference picture selecting unit 4 as the reference picture.

In addition, the local decoding unit 2 decodes the above encoded data using the picture with picture number '9' as the reference picture, and this decoded picture is stored in the encoded reference picture memory 3. Additionally, the picture designation data notification unit 9 sends the data showing picture number '13' of the encoded data to the receiving side, and at this time, the data showing picture number '13' is stored in the encoded picture designation data storage unit 6. In addition, the reference picture notification unit 5 sends the data showing the picture number '9' of the reference number used in encoding to the receiving side.

The operation of the receiving side is as follows:

When it is confirmed in the error detection unit 30 that no error has been detected in the data sent from the sending side, in the picture designation data receiving unit 21, the picture number '13' of the received encoded data is received. In addition, when the reference picture designation data receiving unit 22 receives the reference picture designation data specifying the picture number '9', the decoded reference picture selecting unit 23 selects the picture with picture number '9' is selected as the reference picture, and sent to the decoding unit 20.

In this manner, the decoding unit 20 decodes the encoded picture received using the picture with picture number '9' used as the reference picture, and the correctly decoded picture (picture number '13') is sent to the storage switching unit 75. Additionally, the reference picture designation method control unit 25 directs the sending side to carry out encoding using the latest previously encoded picture as the reference picture. In this manner, the decoded reference picture designation method selecting unit 26 maintains the switching state of switch S1 and switch S2, and sends to the sending side the continuous reference picture designation data showing '1' from the continuous reference picture designation data sending unit 27, and additionally, sends to the sending side the specified reference picture designation data showing '0' from the specified reference picture designation data sending unit 29.

In addition, because the reference picture designation method control unit 25 designates the latest previously encoded picture as the reference picture, the storage determination unit 74 determines that the decoded picture with picture number '13' be stored in the expected reference picture storage unit 72. In this manner, the storage switching unit 75 switches the switching state to the expected reference picture storage unit 72 side, and stores in the expected reference picture storage unit 72 the decoded picture with picture number '13' sent from the decoding unit 20.

In addition, the present reference picture storage determination unit 70 determines that the picture with picture number '13' stored in the expected reference picture storage unit 72 will not be stored in the present reference picture storage unit 71 because the picture number '9' specified by the reference picture designation data that the reference picture designation data receiving unit 22 received and the picture number '12' stored in the decoded picture designation data storage unit 28 do not match. In this manner, the reference picture storage switching unit 73 maintains the switching state in the open side, does not store the picture stored in the expected reference picture storage unit 72 in the present reference picture storage unit 71.

Furthermore, because the storage determination unit 74 determines that the decoded picture with picture number '13' the storage determination unit 74 sent from the decoding unit 20 will be stored in the expected reference picture storage unit 72, the data with picture number '13' that the picture designation data receiving unit 21 receives is stored in the decoded picture designation data storage unit 28.

Next, the operation of the sending side and the receiving side when the picture with picture number '14' is encoded and this encoded data is decoded is shown as STEP 9 in FIG. 15.

The operation on the sending side is as follows:

When the specified reference picture designation data receiving unit 8 receives the specified reference picture designation data of picture number '9' sent when the decoding of the encoded data of picture number '11' was attempted at the sending side, the encoded reference picture selecting unit 4 selects the picture with picture number '9' showing the above specified reference picture designation data from the encoded reference picture memory 3. In this manner, the encoding unit 1 encodes the input picture with picture number '14' using the picture with picture number '9' selected by the encoded reference picture selecting unit 4 as the reference picture.

In addition, the local decoding unit 2 decodes the above encoded data using the picture with picture number '9' as the reference picture, and this decoded picture is stored in the encoded reference picture memory 3. Additionally, the picture designation data notification unit 9 sends the data showing picture number '14' of the encoded data to the receiving side, and at this time, the data showing picture number '14' is stored in the encoded picture designation data storage unit 6. In addition, the reference picture notification unit 5 sends the data showing the picture number '9' of the reference number used in encoding to the receiving side.

The operation of the receiving side is as follows:

When it is confirmed in the error detection unit 30 that no error has been detected in the data sent from the sending side, in the picture designation data receiving unit 21, the picture number '14' of the received encoded data is received. In addition, when the reference picture designation data receiving unit 22 receives the reference picture designation data specifying the picture number '9', the decoded reference picture selecting unit 23 selects the picture with picture '9' is selected as the reference picture, and sent to the decoding unit 20.

In this manner, the decoding unit 20 decodes the encoded picture received using the picture with picture number '9' used as the reference picture, and the correctly decoded picture (picture number '14') is sent to the storage switching unit 75. Additionally, the reference picture designation method control unit 25 directs the sending side to carry out encoding using the latest previously encoded picture as the reference picture. In this manner, the decoded reference picture designation method selecting unit 26 maintains the switching state of switch S1 and switch S2, and sends to the sending side the continuous reference picture designation data showing '1' from the continuous reference picture designation data sending unit 27, and additionally, sends to the sending side the specified reference picture designation data showing '0' from the specified reference picture designation data sending unit 29.

In addition, because the reference picture designation method control unit 25 designates the latest previously encoded picture as the reference picture, the storage determination unit 74 determines that the decoded picture with picture number '14' be stored in the expected reference picture storage unit 72. In this manner, the storage switching unit 75 switches the switching state to the expected reference picture storage unit 72 side, and stores in the expected reference picture storage unit 72 the decoded picture with picture number '14' sent from the decoding unit 20.

In addition, the present reference picture storage determination unit 70 determines that the picture with picture number '14' stored in the expected reference picture storage unit 72 will not be stored in the present reference picture storage unit 71 because the picture number '9' specified by the reference picture designation data that the reference picture designation data receiving unit 22 received and the picture number '13' stored in the decoded picture designation data storage unit 28 do not match. In this manner, the reference picture storage switching unit 73 maintains the switching state in the open side, does not store the picture stored in the expected reference picture storage unit 72 in the present reference picture storage unit 71.

Furthermore, because the storage determination unit 74 determines that the decoded picture with picture number '14' the storage determination unit 74 sent from the decoding unit 20 will be stored in the expected reference picture storage unit 72, the data with picture number '14' that the picture designation data receiving unit 21 receives is stored in the decoded picture designation data storage unit 28.

Next, the operation of the sending side and the receiving side when the picture with picture number '15' is encoded and this encoded data is decoded is shown as STEP 10 in FIG. 15.

The operation of the sending side is as follows:

When the specified reference picture designation data receiving unit 8 receives the continuous reference picture designation data of picture number '1' sent when the encoded data of picture number '12' was decoded at the sending side, the encoded reference picture selecting unit 4 selects the picture with picture number '14' showing the above specified reference picture designation data from the encoded reference picture memory 3. In this manner, the encoding unit 1 encodes the input picture with picture number '15' using the picture with picture number '14' selected by the encoded reference picture selecting unit 4 as the reference picture.

In addition, the local decoding unit 2 decodes the above encoded data using the picture with picture number '14' as the reference picture, and this decoded picture is stored in the encoded reference picture memory 3. Additionally, the picture designation data notification unit 9 sends the data showing picture number '15' of the encoded data to the receiving side, and at this time, the data showing picture number '15' is stored in the encoded picture designation data storage unit 6. In addition, the reference picture notification unit 5 sends the data showing the picture number '14' of the reference number used in encoding to the receiving side.

The operation of the receiving side is as follows:

When it is confirmed in the error detection unit 30 that no error has been detected in the data sent from the sending side, the picture designation data receiving unit 21 receives the picture number '15' of the received encoded data. In addition, when the reference picture designation data receiving unit 22 receives the reference picture designation data showing the picture number '14', the decoded reference picture selecting unit 23 selects the picture with picture number '14' stored in the expected reference picture storage unit 72 as the reference picture, and sends it to the decoding unit 20.

In this manner, the decoding unit 20 decodes the encoded picture received using the picture with picture number '14' used as the reference picture, and the correctly decoded picture (picture number '15') is sent to the storage switching unit 75. Additionally, because no communication errors have been detected in two consecutive frames, the reference picture designation method control unit 25 directs the sending side to carry out encoding using the latest previously encoded picture as the reference picture. In this manner, because the switching state of switch S1 and switch S2 are maintained in their present state as is, the decoded reference picture designation method selecting unit 26 sends to the sending side the continuous reference picture designation data showing '1' from the continuous reference picture designation data sending unit 27, and in addition, sends to the sending time the specified reference picture designation data showing '0' from the specified reference picture designation data sending unit 29.

In addition, because the reference picture designation method control unit 25 designates the latest previously encoded picture as the reference picture, the storage determination unit 74 determines that the decoded picture with picture number '15' be stored in the expected reference picture storage unit 72. In this manner, the storage switching unit 75 switches the switching state to the expected reference picture storage unit 72 side, and stores in the expected reference picture storage unit 72 the decoded picture with picture number '15' sent from the decoding unit 20.

In addition, the present reference picture storage determination unit 70 determines that the picture with picture number '14' stored in the expected reference picture storage unit 72 will be stored in the present reference picture storage unit 71 because the picture number '14' specified by the reference picture designation data that the reference picture designation data receiving unit 22 receives and the picture number '14' stored in the expected reference picture storage unit 72 match. In this manner, the reference picture storage switching unit 73 switches the switching state to the present reference picture storage unit 71 side, and stores the picture stored in the expected reference picture storage unit 72 in the present reference picture storage unit 71.

Furthermore, because the storage determination unit 74 determines that the decoded picture with picture number '15' sent from the decoding unit 20, the data with picture number '15' that the picture designation data receiving unit 21 receives is stored in the decoded picture designation data storage unit 28.

In the above manner, by a combination shown in the first embodiment wherein the receiving side designates to the sending side encoding the previous picture, and the structure shown in the third embodiment wherein the receiving side determines whether or not the decoded picture is to be stored, the reference picture memory at the receiving side can be reduced, and furthermore, it is possible for the receiving side to adjust the decrease in error propagation and decrease the lowering of the encoding efficiency from its point of view.

Moreover, in the first, second, and fourth embodiments, the programs necessary for realizing the operation of the encoding unit 1, the picture designation data notification unit 9, the encoded reference picture memory 3, the encoded reference picture selecting unit 4, the reference picture notification unit 5, the encoded picture designation data storage unit 6, the continuous reference picture designation data receiving unit 7, the specified reference picture designation data receiving unit 8, the picture designation data notification unit 9, the sending side multiplexing unit 10, and the sending side error detection unit 11 shown in FIG. 1, FIG. 6, and FIG. 12 at the sending side shown in the block diagrams in FIG. 1, FIG. 6, and FIG. 14 can be recorded on a computer readable recording medium, such as a CD-ROM, or a floppy disc, and the program recorded on this recording medium can be read into this computer, and by execution, carry out encoding of the input picture and the sending of each type of data to the receiving side.

In addition, in the first, second, and fourth embodiments, the programs necessary for realizing the operation of the decoding unit 20, the picture designation data receiving unit 21, the reference picture designation data receiving unit 22, the decoded reference picture selecting unit 23, the decoded reference picture memory 24, the reference picture designation method control unit 25, the decoded reference picture designation method selecting unit 26, the continuous reference picture designation data sending unit 27, the decoded picture designation data storage unit 28, the specified reference picture designation data sending unit 29, the sending side multiplexing unit 10, the error detection unit 30, the present reference picture storage determination unit 70, the present reference picture storage unit 71, the expected reference picture storage unit 72, the reference picture storage switching unit 73, the storage determination unit 74 and the storage switching unit 75 at the receiving side shown in FIG. 1, FIG. 6, and FIG. 12 shown in the block diagrams of FIG. 1, FIG. 6, and FIG. 14 can be recorded on a computer readable recording medium, such as a CD-ROM, or a floppy disc, and the program recorded on this recording medium can be read into this computer, and by execution, carry out encoding of the input picture and the sending of each type of data to the receiving side.

Furthermore, in the third embodiment, the programs necessary for realizing the operation of the picture encoding unit 40, the reference picture receiving unit 41, the reference picture notification unit 42, the picture designation data notification unit 43, and the sending side multiplexing unit 44 at the sending side shown in the block diagram of FIG. 9 can be recorded on a computer readable recording medium, such as a CD-ROM, or a floppy disc, and the program recorded on this recording medium can be read into this computer, and by execution, carry out encoding of the input picture and the sending of each type of data to the receiving side.

In addition, in the third embodiment, the programs necessary for realizing the operation of the receiving side multiplexing unit 51, the picture designation data receiving unit 52, the reference picture designation data receiving unit 53, the decoding unit 54, the previous picture designation data storage unit 55, the reference picture change unit 56, the storage determination unit 57, the storage change unit 58, the expected reference picture storage unit 59, and the present reference picture storage unit 60 at the receiving side shown in the block diagram of FIG. 9 can be recorded on a computer readable recording medium, such as a CD-ROM, or a floppy disc, and the program recorded on this recording medium can be read into this computer, and by execution, carry out encoding of the input picture and the sending of each type of data to the receiving side.

What is claimed is:

1. A video communication method wherein the sending side encodes the input pictures by the inter-frame prediction encoding method, sends this encoded data to the receiving side, and the receiving side decodes the encoded data sent from the sending side making a previously encoded picture the reference picture, and wherein the receiving side is characterized in having:

a picture designation data receiving step which receives picture designation data designating the pictures encoded at said sending side;

a reference picture designation data receiving step which receives the reference picture designation data designating the reference picture that said sending side will use when encoding;

a reference picture switching step which switches the picture designated by the received reference picture designation data to the reference picture;

a decoding step which decodes said received encoded data using this switched reference picture;

a reference picture storage determination step which determines whether or not to store the picture data decoded by said decoding step as a new reference picture based on said reference picture designation data and a picture designation data which designates a picture stored as said reference picture;

a reference picture storage step which stores only the decoded picture whose storage is determined in said reference picture storage determination step; and a reference picture designation step which designates to the sending side said stored picture as the picture to be used as the reference picture when said sending side is encoding.

2. A video communication method wherein the sending side encodes the input pictures by the inter-frame prediction encoding method, sends this encoded data to the receiving side, and the receiving side decodes the encoded data sent from the sending side making a previously encoded picture the reference picture, and wherein the sending side is characterized in having:

a reference picture designation data receiving step which receives a reference picture designation signal designating the reference picture to be used when encoding said input picture;

a picture encoding step which generates the encoded data of said input picture by the inter-frame prediction encoding method using as the reference picture the picture designated by the reference picture designation data received in said reference picture receiving step;

a picture designation data notification step which generates picture designation data that designates the picture encoded in said picture encoding step, and, notifies said receiving side; and a reference picture notification step which generates reference picture designation data designating the reference picture that said picture encoding step will use when encoding, and notifies said receiving side; and further wherein said receiving side is characterized in having:
   a picture designation data receiving step which receives picture designation data designating the picture encoded at said sending side;

a reference picture designation data receiving step which receives the reference picture designating the reference picture that said sending side will use when encoding;

a reference picture switching step which switches the picture designated by the received reference picture designation data to the reference picture;

a decoding step which decodes said received encoded data using this switched reference picture;

a reference picture storage determination step which determines whether or not to store the picture data decoded by said encoding step as a new reference picture based on said reference picture designation data and a picture designation data which designates a picture stored as said reference picture;

a reference picture storage step which stores only the decoded picture whose storage is determined in said reference picture storage determination step; and an encoding reference picture designation step which generates encoded reference picture designation data designating said stored picture as the picture said sending side will use as the referenced picture when encoding, and send it to the sending side.

3. A video communication system wherein the sending side encodes the input pictures by the inter-frame prediction encoding method, sends this encoded data to the receiving side, and the receiving side decodes the encoded data sent from the sending side making a previously encoded picture the reference picture, and wherein the receiving side is characterized in having:

a picture designation data receiving unit which receives reference picture data designating the picture encoded at said sending side;

a reference picture designation data receiving unit which receives the reference picture designation data designating the reference picture that said sending side will use when encoding;

a reference picture switching unit which switches the received picture designated by the reference picture designation data to the reference picture;

a decoding unit which decodes said received encoded data using this switched reference picture;

a reference picture storage determination unit which determines whether or not to store picture data decoded by said decoding unit as a new reference picture based on said reference picture designation data and a picture designation data which designates a picture stored as said reference picture;

a reference picture storage unit which stores only the decoded picture that said reference picture storage determination unit has determined will be stored as the reference picture; and a reference picture designation unit which designates to the sending side said stored picture as the picture which said receiving side used as the reference picture when encoding.

4. A video communication system wherein the sending side encodes the input pictures by the inter-frame prediction encoding method, sends this encoded data to the receiving side, and the receiving side decodes the encoded data sent from the sending side making a previously encoded picture the reference picture, and wherein the sending side is characterized in having:

an encoding reference picture designation data receiving unit which receives encoding reference picture designation data from said receiving side designating the reference picture used when encoding said input picture;

a picture encoding unit which generates the encoded data of said input picture by the inter-frame prediction encoding method using the picture indicated by the reference picture designation data that said encoding reference picture designation data receiving unit has received;

a picture designation data notification unit which generates picture designation data designating the picture that said picture encoding unit has encoded, and notifies said receiving side; and a reference picture notification unit which generates reference picture designation data designating the reference picture said picture encoding unit used when encoding, and notifying said receiving side; and furthermore wherein said receiving side provides a picture designation data receiving unit which receives references picture data designating the picture encoded at said sending side;

a reference picture designation data receiving unit which receives the reference picture designation data designating the reference picture that said sending side will use when encoding;

a reference picture switching unit which switches the received picture designated by the reference picture designation data to the reference picture;

a decoding unit which decodes said received encoded data using this switched reference picture;

a reference picture storage determination unit which determines whether or not to store picture data decoded by said decoding unit as a new reference picture based on said reference picture designation data and a picture designation data which designates a picture stored as said reference picture;

a reference picture storage unit which stores only the decoded picture that said reference picture storage determination unit has determined will be stored as the reference picture; and an encoded reference picture designation sending unit which generates encoded reference picture designation data designating said stored picture as the picture said sending side will use as reference picture when encoding, and sends it to the sending side.

5. A computer readable recording medium which records a video communication program that receives encoded data sent from the sending side and decodes this encoded data using a previously decoded picture as a reference picture, and which executes in a computer:

a step which receives picture designation data designating the picture encoded at said sending side;

a step which receives reference picture designation data designating the reference picture said sending side used when encoding;

a step which switches the picture designated by the reference picture designation data to the reference picture;

a step which decoded said received encoded data using said switched reference picture;

a step which determines whether or not to store this decoded picture data as a new reference pictured based on said reference picture designation data and a picture designation data which designates a picture stored as said referenced picture;

a step which stores only the decoded picture determined to be stored as a result of this determination as the reference picture; and a step which designates to the sending side said stored picture as the picture that said sending side is to use as the reference picture when encoding.

* * * * *

UNITED STATES PATENT AND TRADEMARK OFFICE
CERTIFICATE OF CORRECTION

PATENT NO.     : 6,621,868 B1
DATED          : September 16, 2003
INVENTOR(S)    : Kimata et al.

It is certified that error appears in the above-identified patent and that said Letters Patent is hereby corrected as shown below:

Column 20,
Line 64, replace "lencodes" with -- 1 encodes --.

Column 23,
Line 60, replace "continues" with -- continuous --.

Signed and Sealed this

Ninth Day of December, 2003

JAMES E. ROGAN
*Director of the United States Patent and Trademark Office*